United States Patent
Yan et al.

(10) Patent No.: US 12,289,626 B2
(45) Date of Patent: Apr. 29, 2025

(54) DUAL/MULTI-CONNECTIVITY-BASED SECONDARY NODE ADDITION/REPLACEMENT METHOD AND DEVICE

(71) Applicant: DATANG MOBILE COMMUNICATIONS EQUIPMENT CO., LTD., Beijing (CN)

(72) Inventors: Nan Yan, Beijing (CN); Chandrika Kumudinie Worrall, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 291 days.

(21) Appl. No.: 17/427,293

(22) PCT Filed: Dec. 23, 2019

(86) PCT No.: PCT/CN2019/127679
§ 371 (c)(1),
(2) Date: Jul. 30, 2021

(87) PCT Pub. No.: WO2020/155936
PCT Pub. Date: Aug. 6, 2020

(65) Prior Publication Data
US 2022/0116803 A1    Apr. 14, 2022

(30) Foreign Application Priority Data
Jan. 31, 2019 (CN) .......................... 201910099458.X

(51) Int. Cl.
*H04W 74/0833* (2024.01)
*H04W 24/08* (2009.01)
(Continued)

(52) U.S. Cl.
CPC ....... *H04W 24/08* (2013.01); *H04W 36/0069* (2018.08); *H04W 74/0833* (2013.01); *H04W 76/27* (2018.02)

(58) Field of Classification Search
None
See application file for complete search history.

(56) References Cited

U.S. PATENT DOCUMENTS

| 2016/0183322 A1* | 6/2016 | Huang | ................. H04W 76/15 455/434 |
| 2016/0192245 A1* | 6/2016 | He    | ..................... H04W 84/045 370/331 |

(Continued)

FOREIGN PATENT DOCUMENTS

| CN | 104936163 A | 9/2015 |
| CN | 106304403 A | 1/2017 |

(Continued)

OTHER PUBLICATIONS

Machine Translation of CN 106304403, which was provided with only an abstract in the IDS dated Jul. 30, 2021 (Year: 2023).*

(Continued)

*Primary Examiner* — Benjamin Lamont
(74) *Attorney, Agent, or Firm* — Meunier Carlin & Curfman LLC

(57) ABSTRACT

The present application relates to the technical field of wireless communications, and disclosed are a dual/multi-connectivity-based secondary node (SN) addition/replacement method and device, for use in solving problems that in a dual/multi-connectivity scenario of a wireless communication, a process of adding or modifying an SN takes a long time and causes data transmission delay, and the probability of using dual-connectivity to transmit data is reduced because the establishment time of dual/multi-connectivity is too long. The method in the present application comprises:

(Continued)

a user equipment receives configuration information of one/more SNs sent by a master node (MN); performing measurement assessment on the one/more SNs according to the configuration information of the one/more SNs to determining an SN satisfying a connectivity condition; and initiating a random access process to the SN satisfying the connectivity condition.

16 Claims, 9 Drawing Sheets

(51) Int. Cl.
*H04W 36/00* (2009.01)
*H04W 76/27* (2018.01)

(56) References Cited

U.S. PATENT DOCUMENTS

| | | | |
|---|---|---|---|
| 2017/0055187 A1 | 2/2017 | Kang et al. | |
| 2017/0099693 A1* | 4/2017 | Deng | ............... H04W 24/10 |
| 2018/0199242 A1 | 7/2018 | Deng et al. | |
| 2018/0199315 A1 | 7/2018 | Hong et al. | |
| 2019/0230515 A1* | 7/2019 | Quan | ............... H04W 24/08 |
| 2021/0120458 A1* | 4/2021 | Koskela | ......... H04W 36/00837 |

FOREIGN PATENT DOCUMENTS

| | | |
|---|---|---|
| CN | 107708104 A | 2/2018 |
| CN | 108282836 A | 7/2018 |
| EP | 3032882 A1 | 6/2016 |
| EP | 3316625 A1 | 5/2018 |
| KR | 20170022956 A | 3/2017 |

OTHER PUBLICATIONS

Ericsson. "Introduction of option 3—Dual Connectivity with NR in E-UTRAN—RAN3 parts" 3 GPP TSG-RAN WG3 Meeting #95bis Spokane, WA, USA R3-171152, Apr. 7, 2017, sections 4.9, 10.1.2.8. 47 pages.
International Search Report issued in PCT/CN2019/127679 on Mar. 24, 2020. 4 pages including English translation.
3GPP TS, 3rd Generation Partnership Project; Technical Specification Group Radio Access Network; Evolved Universal Terrestrial Radio Access (E-UTRA) and NR; Multi-connectivity; Stage 2 (Release 15), 37.340 v15.4.0 (Dec. 2018).

* cited by examiner

DUAL/MULTI-CONNECTIVITY-BASED SECONDARY NODE ADDITION/REPLACEMENT METHOD AND DEVICE

CROSS-REFERENCE OF RELATED APPLICATIONS

The present application is a National Stage of International Application No. PCT/CN2019/127679, filed on Dec. 23, 2019, which claims priority from Chinese Patent Application No. 201910099458.X, filed with the Chinese Patent Office on Jan. 31, 2019 and entitled "Dual/Multi-Connectivity-Based Secondary Node Addition/Replacement Method and Device", both of which are hereby incorporated by reference in their entireties.

FIELD OF INVENTION

The present application relates to the field of wireless communication technology, and in particular to a dual/multi-connectivity-based secondary node addition/replacement method and device.

BACKGROUND

In the wireless network technology, in a dual/multi-connection scenario where a Master Node (MN) is connected to one or more Secondary Nodes (SNs), the SN to which a user terminal UE is connected is mainly added or replaced in three ways as follows:
1) the MN initiates the SN adding process;
2) the MN initiates the SN change process;
3) the SN initiates the SN change process.

In the above three ways to add or replace the SN, the network side needs to send the configuration measurement information to the user terminal UE. The UE evaluates the measurement result according to the configuration measurement information, and sends a measurement result report to the network side when determining that the measurement result meets the requirements. After that, the network side initiates an SN adding/change request to the SN according to the measurement result report reported by the UE. The SN needs to send a feedback carrying the SN-related configuration to the MN. After receiving the feedback, the MN sends a reconfiguration message to the UE, and the UE receives the reconfiguration message and initiates a random access process to the SN. The UE connects to the MN and SN simultaneously on the air interface and transmits data through dual/multiple connections, which can increase the UE's data volume/throughput and meet the high-rate service transmission requirement.

However, the aforementioned process of the UE to access the dual/multiple connections consumes a long time, resulting in the too long delay of the UE between determining that the measurement result meets the measurement evaluation requirements and establishing the dual/multiple connections, which may cause the data transmission delay and affect the UE's data volume/throughput. For a cell scenario, the too long time of the UE to establish the dual/multiple connections in a certain cell reduces the probability of using dual connections to transmit data, that is, when the dual/multiple connections are just established or have not been established in the original cell, the UE may have been handed over to a new cell, and thus the aforementioned dual/multiple connections in the original cell may not be used to transmit data, reducing the data transmission efficiency.

To sum up, in the dual/multi-connection scenarios, the process of adding or replacing the secondary nodes takes a long time, the data transmission delay may be caused, and the establishment time of dual/multiple connections is too long so that the probability of using dual connections to transmit data is reduced.

BRIEF SUMMARY

The present application provides a dual/multi-connectivity-based secondary node addition/replacement method and device, so as to solve the problems in the prior art that the process of adding or replacing the secondary nodes takes a long time, the data transmission delay may be caused, and the establishment time of dual/multiple connections is too long so that the probability of using dual connections to transmit data is reduced in the dual/multi-connection scenarios.

In a first aspect, the present application provides a dual/multi-connectivity-based secondary node addition/replacement method, which includes:
receiving configuration information of one or more SNs sent by an MN;
performing a measurement evaluation on the one or more SNs according to the configuration information of the one or more SNs to determine an SN satisfying a connectivity condition;
initiating a random access process to the SN satisfying the connectivity condition.

In the above method, compared with the process in which a UE measures and evaluates the SNs firstly, then reports the result to an MN, then receives the configuration information of the SNs forwarded by the MN and then establishes a connection, the above method firstly performs the SN configuration; and after performing the measurement evaluation on the SNs to determine an SN satisfying the connectivity condition, the UE initiates a random access process to the above-mentioned SN satisfying the connectivity condition. The process from the measurement evaluation performed by the UE on the SNs to the establishment of random access is short, the less time and few resources are used, and it is more convenient and efficient to add/replace the SN.

In a possible implementation, the MN is a master network node entity MN or a master serving cell under the master network node entity MN, and the SN is a secondary network node entity SN or a master serving cell under the secondary network node entity SN.

In a possible implementation, after determining the SN satisfying the connectivity condition, the method further includes:
notifying the MN of the SN satisfying the connectivity condition through an RRC reconfiguration complete message sent to the MN; or
notifying the MN of the SN satisfying the connectivity condition through an SN access request/notification/instruction message separately sent to the MN.

In the above method, the UE informs the MN of the SN satisfying the connectivity condition in many ways, which can be applied to different scenarios, and the UE can notify the MN of the SN satisfying the connectivity condition in the RRC reconfiguration complete message, saving the signaling interaction and the use of resources.

In a possible implementation, the connectivity condition includes any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires.

In a possible implementation, the measurement quantities include any one or more of:

Reference Signal Receiving Power (RSRP);
Reference Signal Receiving Quality (RSRQ);
Signal to Interference & Noise Ratio (SINR).

In the above method, the UE performs the measurement evaluation on the SN through a plurality of measurement quantities, so that the measurement evaluation result is more reliable.

In a possible implementation, receiving configuration information of one or more SNs sent by the MN, includes:

receiving an RRC reconfiguration message sent by the MN, and obtaining the configuration information of one or more SNs sent by the MN.

In a possible implementation, receiving an RRC reconfiguration message sent by the MN, includes:

receiving an RRC reconfiguration message sent by the MN separately for configuration information of each SN in the configuration information of the one or more SNs; or receiving an RRC reconfiguration message sent by the MN after extracting or separately cascading the configuration information of one or more SNs.

In the above method, the UE can receive the configuration information of multiple SNs by receiving an RRC reconfiguration message sent by the MN, saving the signaling interaction between the UE and the MN, and saving the signaling transmission resources.

In a possible implementation, the method further includes:

sending an RRC reconfiguration complete message corresponding to the configuration information of the one or more SNs directly to the MN after receiving the RRC reconfiguration message sent by the master node; or sending an RRC reconfiguration complete message corresponding to the configuration information of the SN satisfying the connectivity condition to the MN after determining the SN satisfying the connectivity condition.

In the above method, the UE can notify the MN of the SN satisfying the connectivity condition after determining the SN satisfying the connectivity condition, so that the MN can learn the SN satisfying the connectivity condition when the UE initiates a random access process to the SN satisfying the connectivity condition, shortening the time for the UE to notify the MN of the SN satisfying the connectivity condition.

In a second aspect, the present application provides a dual/multi-connectivity-based secondary node addition/replacement method, which includes:

sending an SN addition request to one or more SNs in advance;

receiving configuration information returned by the one or more SNs, and sending the configuration information of the one or more SNs to a UE.

In the above method, the MN sends an SN addition request to the SN in advance to notify the SN to complete the SN configuration preparation process, and then forwards the SN configuration information to the UE, so that the UE can perform the measurement evaluation on the SN after obtaining the SN configuration information, thereby shortening the time for the UE to initiate a random connection with the SN during the measurement evaluation.

In a possible implementation, the SN is a secondary network node entity SN or a master serving cell under the secondary network node entity SN.

In a possible implementation, after sending the configuration information of the one or more SNs to the UE, the method further includes:

obtaining an SN satisfying a connectivity condition determined by the UE based on a measurement evaluation of the one or more SNs; or receiving the determined SN satisfying the connectivity condition notified after the SN satisfying the connectivity condition establishes a connection with the UE.

In the above method, the MN can learn the SN satisfying the connectivity condition after the UE performs the measurement evaluation on the SN, shortening the time for the MN to learn the SN satisfying the connectivity condition; or obtain the message sent by the SN and learn the information of the connected SN after the SN establishes a connection with the UE, adding a way for the MN to obtain the SN satisfying the connectivity condition.

In a possible implementation, the method further includes:

releasing SNs that have not been requested by the UE to establish connections after determining that the UE establishes a connection with the SN satisfying the connectivity condition.

In the above method, the MN releases the SNs that have not been requested by the UE to establish connections, so that other UEs request to establish the random access processes to the SNs, improving the utilization rate of the SNs in the system and thereby improving the data transmission efficiency of the entire system.

In a possible implementation, the connectivity condition includes any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires.

In a possible implementation, the measurement quantities include any one or more of:

Reference Signal Receiving Power (RSRP);
Reference Signal Receiving Quality (RSRQ);
Signal to Interference & Noise Ratio (SINR).

In a possible implementation, obtaining an SN satisfying a connectivity condition determined by the UE based on a measurement evaluation of the one or more SNs, includes:

obtaining the determined SN satisfying the connectivity condition through an RRC reconfiguration complete message sent by the UE; or obtaining the determined SN satisfying the connectivity condition through an SN access request/notification/instruction message sent separately by the UE.

In the above method, the MN can learn the SN satisfying the connectivity condition in a variety of ways, which are suitable for various scenarios, and the MN can learn the SN satisfying the connectivity condition in time through the above method.

In a possible implementation, after obtaining the determined SN satisfying the connectivity condition through the RRC reconfiguration complete message sent by the UE, the method further includes:

sending an SN reconfiguration complete message to the SN satisfying the connectivity condition.

In a possible implementation, the method further includes:

obtaining the SN satisfying the connectivity condition determined by the UE based on a measurement evaluation of the one or more SNs; or sending an SN change confirmation message to an original SN that has been connected to the UE previously after receiving the determined SN satisfying the connectivity condition notified after the SN satisfying the connectivity condition establishes a connection with the UE.

In the above method, after the UE establishes a connection with a new SN, the MN can promptly notify the original SN that established a connection with the UE before the change occurs, so that the original SN can learn the SN change confirmation message in time, so as to save the resources of the original SN.

In a possible implementation, sending an SN addition request to one or more SNs in advance, includes:

sending an SN addition request to one or more SNs based on an early measurement result reported by the UE.

In the above method, the MN sends an SN addition request to the estimated SN satisfying the connectivity condition based on the early measurement result of the SN reported by the UE, reducing the useless signaling interaction and saving the resources of the entire system.

In a possible implementation, sending an SN addition request to one or more SNs in advance, includes:

sending an SN addition request to one or more SNs based on an SN change request sent by an original SN that has been connected to the UE.

In a possible implementation, receiving configuration information returned by the one or more SNs and sending the configuration information of the one or more SNs to a UE, includes:

receiving the configuration information returned by the one or more SNs through an addition request confirmation message;

sending the configuration information of the one or more SNs to the UE through an RRC reconfiguration message.

In a possible implementation, sending the configuration information of the one or more SNs to the UE through an RRC reconfiguration message, includes:

sending configuration information of each SN in the configuration information of the one or more SNs to the UE by sending an RRC reconfiguration message separately; or sending the configuration information of the one or more SNs after being extracted or separately cascaded to the UE through an RRC reconfiguration message.

In the above method, the UE can put the configuration information of multiple SNs in one RRC reconfiguration message and send it to the UE, reducing the signaling interaction and saving the system resources.

In a possible implementation, the method further includes:

receiving an RRC reconfiguration complete message corresponding to the configuration information of the one or more SNs sent directly by the UE after receiving the RRC reconfiguration message; or receiving an RRC reconfiguration complete message corresponding to the configuration information of the SN satisfying the connectivity condition sent by the UE after determining the SN satisfying the connectivity condition.

In a possible implementation, the method further includes: receiving indication information indicating that the SN has completed establishment of a random access with the UE sent by the SN satisfying the connectivity condition.

In the above method, the MN can receive the RRC reconfiguration complete message sent by the UE or SN in real time in a variety of ways to determine the SN satisfying the connectivity condition or the SN that has established a connection with the UE, so as to release the remaining SNs not requested by the UE to improve the use efficiency of SNs in the system, and then improve the efficiency of data transmission.

In a possible implementation, after receiving the RRC reconfiguration complete message corresponding to the configuration information of the one or more SNs sent directly by the UE after receiving the RRC reconfiguration message, the method further includes:

sending an SN reconfiguration complete message to the one or more SNs.

In a possible implementation, after receiving the RRC reconfiguration complete message corresponding to the configuration information of the SN satisfying the connectivity condition sent by the UE after determining the SN satisfying the connectivity condition, the method further includes:

sending an SN change confirmation message to an original SN that has been connected to the UE previously.

In the above method, after learning the SN that established a connection with the UE, the MN reports it to the original SN connected to the UE before the change occurs, so as to save the resources of the original SN.

In a third aspect, the present application provides a terminal device for a dual/multi-connectivity-based secondary node addition/replacement method. The device includes a processor and a memory, the memory is configured to store a program executable by the processor, and the processor is configured to read the program in the memory and perform the following steps:

receiving configuration information of one or more SNs sent by an MN;

performing a measurement evaluation on the one or more SNs according to the configuration information of the one or more SNs to determine an SN satisfying a connectivity condition;

initiating a random access process to the SN satisfying the connectivity condition.

In a possible implementation, the MN is a master network node entity MN or a master serving cell under the master network node entity MN, and the SN is a secondary network node entity SN or a master serving cell under the secondary network node entity SN.

In a possible implementation, the processor is specifically configured to:

notify the MN of the SN satisfying the connectivity condition through an RRC reconfiguration complete message sent to the MN; or notify the MN of the SN satisfying the connectivity condition through an SN access request/notification/instruction message separately sent to the MN.

In a possible implementation, the connectivity condition includes any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires.

In a possible implementation, the measurement quantities include any one or more of:

Reference Signal Receiving Power (RSRP);
Reference Signal Receiving Quality (RSRQ);
Signal to Interference & Noise Ratio (SINR).

In a possible implementation, the processor is configured to:

receive an RRC reconfiguration message sent by the MN, and obtain the configuration information of one or more SNs sent by the MN.

In a possible implementation, the processor is configured to:

receive an RRC reconfiguration message sent by the MN separately for configuration information of each SN in the configuration information of the one or more SNs; or receive an RRC reconfiguration message sent by the MN after extracting or separately cascading the configuration information of one or more SNs.

In a possible implementation, the processor is further configured to:

send an RRC reconfiguration complete message corresponding to the configuration information of the one or more SNs directly to the MN after receiving the RRC reconfiguration message sent by the master node; or send an RRC reconfiguration complete message corresponding to the configuration information of the SN satisfying the connectivity condition to the MN after determining the SN satisfying the connectivity condition.

In a fourth aspect, the present application provides a network-side device for a dual/multi-connectivity-based secondary node addition/replacement method. The device includes a processor and a memory, the memory is configured to store a program executable by the processor, and the processor is configured to read the program in the memory and perform the following steps:

sending an SN addition request to one or more SNs in advance;

receiving configuration information returned by the one or more SNs, and sending the configuration information of the one or more SNs to a UE.

In a possible implementation, the SN is a secondary network node entity SN or a master serving cell under the secondary network node entity SN.

In a possible implementation, the processor is further configured to:

obtain an SN satisfying a connectivity condition determined by the UE based on a measurement evaluation of the one or more SNs; or receive the determined SN satisfying the connectivity condition notified after the SN satisfying the connectivity condition establishes a connection with the UE.

In a possible implementation, the processor is further configured to:

release SNs that have not been requested by the UE to establish connections after determining that the UE establishes a connection with the SN satisfying the connectivity condition.

In a possible implementation, the connectivity condition includes any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires.

In a possible implementation, the measurement quantities include any one or more of:

Reference Signal Receiving Power (RSRP);
Reference Signal Receiving Quality (RSRQ);
Signal to Interference & Noise Ratio (SINR).

In a possible implementation, the processor is configured to:

obtain the determined SN satisfying the connectivity condition through an RRC reconfiguration complete message sent by the UE; or obtain the determined SN satisfying the connectivity condition through an SN access request/notification/instruction message sent separately by the UE.

In a possible implementation, after obtaining the determined SN satisfying the connectivity condition through the RRC reconfiguration complete message sent by the UE, the processor is further configured to:

send an SN reconfiguration complete message to the SN satisfying the connectivity condition.

In a possible implementation, the processor is further configured to:

obtain the SN satisfying the connectivity condition determined by the UE based on a measurement evaluation of the one or more SNs; or sending an SN change confirmation message to an original SN that has been connected to the UE previously after receiving the determined SN satisfying the connectivity condition notified after the SN satisfying the connectivity condition establishes a connection with the UE.

In a possible implementation, the processor is configured to:

send an SN addition request to one or more SNs based on an early measurement result reported by the UE.

In a possible implementation, the processor is configured to:

send an SN addition request to one or more SNs based on an SN change request sent by an original SN that has been connected to the UE.

In a possible implementation, the processor is configured to:

receive the configuration information returned by the one or more SNs through an addition request confirmation message;

send the configuration information of the one or more SNs to the UE through an RRC reconfiguration message.

In a possible implementation, the processor is configured to:

send configuration information of each SN in the configuration information of the one or more SNs to the UE by sending an RRC reconfiguration message separately; or send the configuration information of the one or more SNs after being extracted or separately cascaded to the UE through an RRC reconfiguration message.

In a possible implementation, the processor is further configured to:

receive an RRC reconfiguration complete message corresponding to the configuration information of the one or more SNs sent directly by the UE after receiving the RRC reconfiguration message; or receive an RRC reconfiguration complete message corresponding to the configuration information of the SN satisfying the connectivity condition sent by the UE after determining the SN satisfying the connectivity condition.

In a possible implementation, the processor is further configured to:

receive indication information indicating that the SN has completed establishment of a random access with the UE sent by the SN satisfying the connectivity condition.

In a possible implementation, after receiving the RRC reconfiguration complete message corresponding to the configuration information of the one or more SNs sent directly by the UE after receiving the RRC reconfiguration message, the processor is further configured to:

send an SN reconfiguration complete message to the one or more SNs.

In a possible implementation, after receiving the RRC reconfiguration complete message corresponding to the configuration information of the SN satisfying the connectivity condition sent by the UE after determining the SN satisfying the connectivity condition, the processor is further configured to:

send an SN change confirmation message to an original SN that has been connected to the UE previously.

In a fifth aspect, the present application provides a terminal apparatus for a dual/multi-connectivity-based secondary node addition/replacement method, which includes:

an SN configuration information receiving unit configured to receive configuration information of one or more SNs sent by an MN;

a connectivity condition judging unit configured to perform a measurement evaluation on the one or more SNs according to the configuration information of the one or more SNs to determine an SN satisfying a connectivity condition;

a connection establishment unit configured to initiate a random access process to the SN satisfying the connectivity condition.

In a sixth aspect, the present application provides a network-side apparatus for a dual/multi-connectivity-based secondary node addition/replacement method, which includes:

an SN addition request sending unit configured to send an SN addition request to one or more SNs in advance;

an SN configuration information forwarding unit configured to receive configuration information returned by the one or more SNs, and send the configuration information of the one or more SNs to a UE.

In a seventh aspect, the present application further provides a computer storage medium storing a computer program thereon, where the program implements the steps of the method described in the first aspect when executed by a processing unit.

In an eighth aspect, the present application further provides a computer storage medium storing a computer program thereon, where the program implements the steps of the method described in the second aspect when executed by a processing unit.

Furthermore, the technical effects brought about by any implementation in the third to eighth aspects can refer to the technical effects brought about by different implementations in the first and second aspects, and will not be repeated here.

BRIEF DESCRIPTION OF THE DRAWINGS

In order to illustrate the technical solutions in the embodiments of the present application more clearly, the accompanying figures which need to be used in describing the embodiments will be introduced below briefly. Obviously the accompanying figures described below are only some embodiments of the present application, and other accompanying figures can also be obtained by those ordinary skilled in the art according to these accompanying figures without creative labor.

DETAILED DESCRIPTION OF THE EMBODIMENTS

In order to make the objects, technical solutions and advantages of the present application clearer, the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

Some words that appear herein will be explained below:

1. The character "/" in embodiments of the present application generally indicates that the associated objects before and after it have the "or" relationship;

2. The master node "MN" in embodiments of the present application may be a master network node entity MN or a master serving cell under the master network node entity MN in dual/multi-connection scenarios; and the secondary node "SN" in the embodiments of the present application is a secondary network node entity SN or a master serving cell under the secondary network node entity SN in dual/multi-connection scenarios.

The application scenarios described in embodiments of the present application are intended to illustrate the technical solutions of the embodiments of the present application more clearly, and do not constitute a limitation on the technical solutions provided in the embodiments of the present application. As can be known by those ordinary skilled in the art, with the appearance of new application scenarios, the technical solutions provided in the embodiments of the present application are also applicable to similar technical problems. Here, in the description of the present application, "multiple" means two or more unless otherwise specified.

Figure 1:
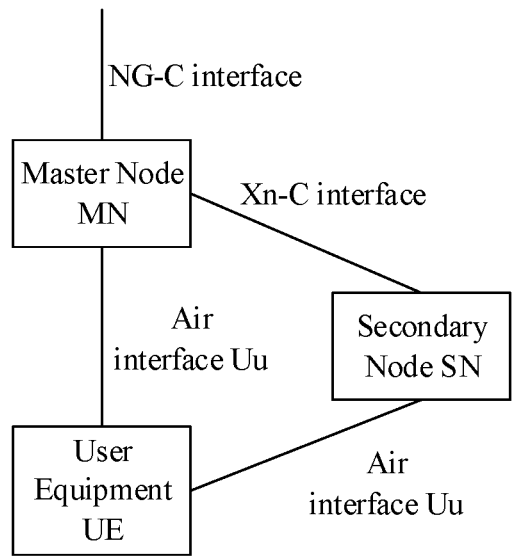
FIG. 1 is a schematic diagram of a dual connection provided by an embodiment of the present application.

There is one MN (Master Node) and one or more SNs (Secondary Nodes) in the wireless communication. Both the MN and SN nodes may be base station nodes that support the long-term evolution/4G network to the long-term evolution 5G network LTE/e-LTE/NR. In the wireless communication, there is a dual connection between one MN and one SN (as shown in FIG. 1), and a multi-connection scenario between one MN and multiple SNs.

When a user terminal UE transmits data, it can be connected to the MN and SN at the same time through the air interface. The MN and SN are connected through the Xn-C interface (for 5GC core network) or X2-C interface (for EPC core network). The dual/multi-connection data transmission can increase the data volume/throughput of the UE and meet the high-speed service transmission requirement.

In the above dual/multi-connection scenarios, the SN to which the user terminal UE is connected is mainly added or replaced in three ways as follows:

1) the MN initiates the SN adding process;
2) the MN initiates the SN change process;
3) the SN initiates the SN change process.

In the three scenarios described above, the specific process for the addition/replacement of secondary nodes is as follows.

Scenario 1: SN addition initiated by MN, when the network decides to add/replace an SN node for a user terminal UE or modify the radio resource configuration of the SCG (Secondary Cell Group) for an existing SN node, the SN addition process needs to be initiated if the MN wants to add a new SN node.

Figure 2:
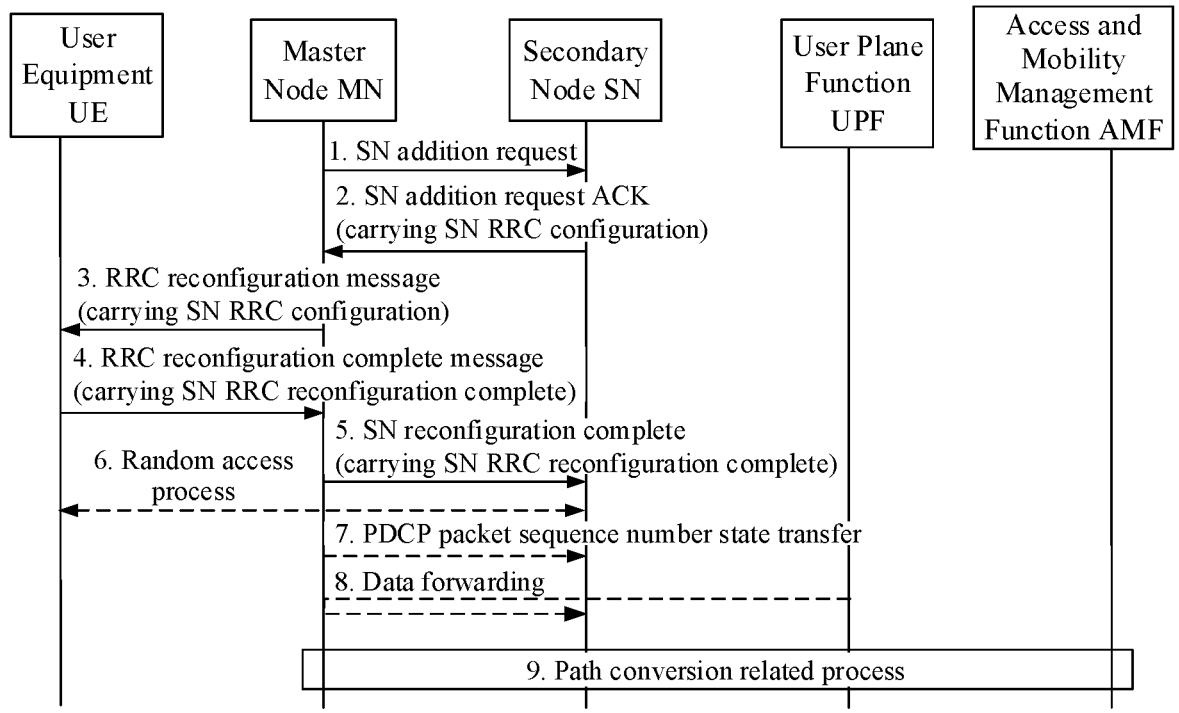
FIG. 2 is a schematic diagram of the existing process of SN addition initiated by the MN provided by a first embodiment of the present application.

FIG. 2 shows the SN addition process of the RAT (Radio Access Technology) dual-connection MR-DC connected to the 5G core network 5GC.

In FIG. 2, UPF is the abbreviation of User Plane Function, and the full name thereof is User Plane Function in English; AMF is the abbreviation of Access and Mobility Management Function, and the full name thereof is Access and Mobility Management Function in English; RRC is the abbreviation of Radio Resource Control, and the full name thereof is Radio Resource Control in English; PDCP is the abbreviation of Packet Data Convergence Protocol, and the full name thereof is Packet Data Convergence Protocol in English; ACK is the abbreviation of Acknowledgement Message, and the full name thereof is Acknowledgement in English.

The specific SN addition process is as follows:

Step 1) the MN sends an SN addition request to the SN node;

Step 2) the SN replies to the MN with an SN addition request acknowledgement message ACK, wherein the ACK carries the SN RRC (Radio Resource Control) configuration;

Step 3) the MN sends an RRC reconfiguration message to the UE, wherein the RRC reconfiguration message carries the SN RRC configuration;

Step 4) the UE replies to the MN with an RRC reconfiguration complete message, wherein the RRC reconfiguration complete message carries the SN RRC reconfiguration complete information;

Step 5) the MN sends a related reconfiguration complete message to the SN, wherein the reconfiguration complete message carries the SN RRC reconfiguration complete information;

Step 6) perform a random access process between the UE and SN;

Steps 7-9) the PDCP (Packet Data Convergence Protocol) packet sequence number state transfer, data forwarding, path conversion and other processes among the MN, SN and core network nodes.

Scenario 2: SN change initiated by MN.

Figure 3:
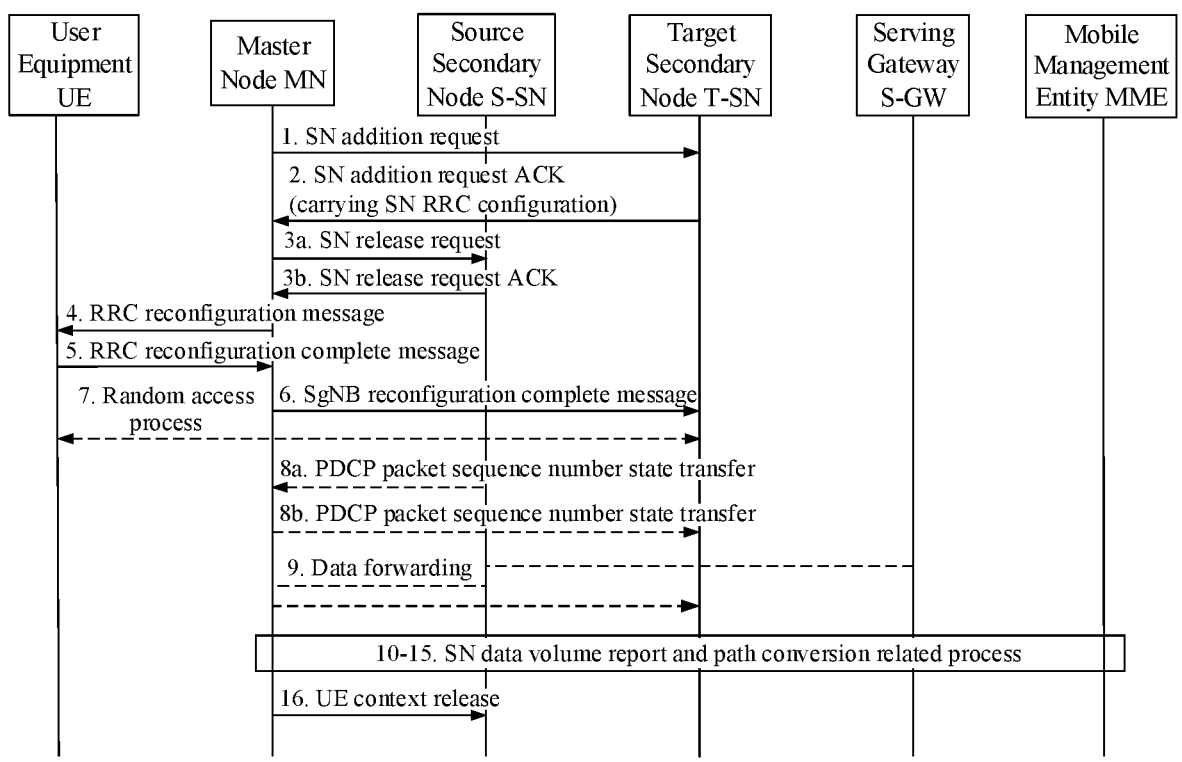
FIG. 3 is a schematic diagram of the existing process of SN change initiated by the MN provided by the first embodiment of the present application.

If the MN wants to replace an existing source SN node, it needs to initiate an SN change process, for example, the SN change process initiated by the MN connected to the dual-connectivity EN-DC (E-UTRA-NR) of the 4G core network EPC. The schematic flowchart of the process is shown in FIG. 3, and specifically includes:

Step 1) the MN sends an SN addition request to the Target Secondary Node (T-SN);

Step 2) the T-SN replies to the MN with an SN addition request ACK, wherein the SN addition request ACK carries the SN RRC configuration information;

Step 3a) the MN sends an SN release request to the Source Secondary Node (S-SN);

It should be understood that the above S-SN is the SN that establishes a connection with the UE before the SN change initiated by the above MN;

Step 3b) the S-SN replies to the MN with an SN release request ACK;

Step 4) the MN sends an RRC reconfiguration message to the UE, wherein the RRC reconfiguration message carries the configuration parameters related to the T-SN;

Step 5) the UE replies to the MN with an RRC reconfiguration complete message, wherein the RRC reconfiguration complete message carries the information about the completion of the T-SN configuration;

Step 6) the MN sends an SN reconfiguration complete message to the T-SN, wherein the SN reconfiguration complete message carries the information about the completion of the T-SN configuration;

Step 7) perform a random access process between the UE and T-SN;

Steps 8-15) the data packet sequence number state transfer among base station nodes, the data forwarding, and the path conversion among core network nodes, etc.;

Step 16) the MN instructs the S-SN to release the UE context.

Scenario 3: SN change initiated by SN.

Figure 4:
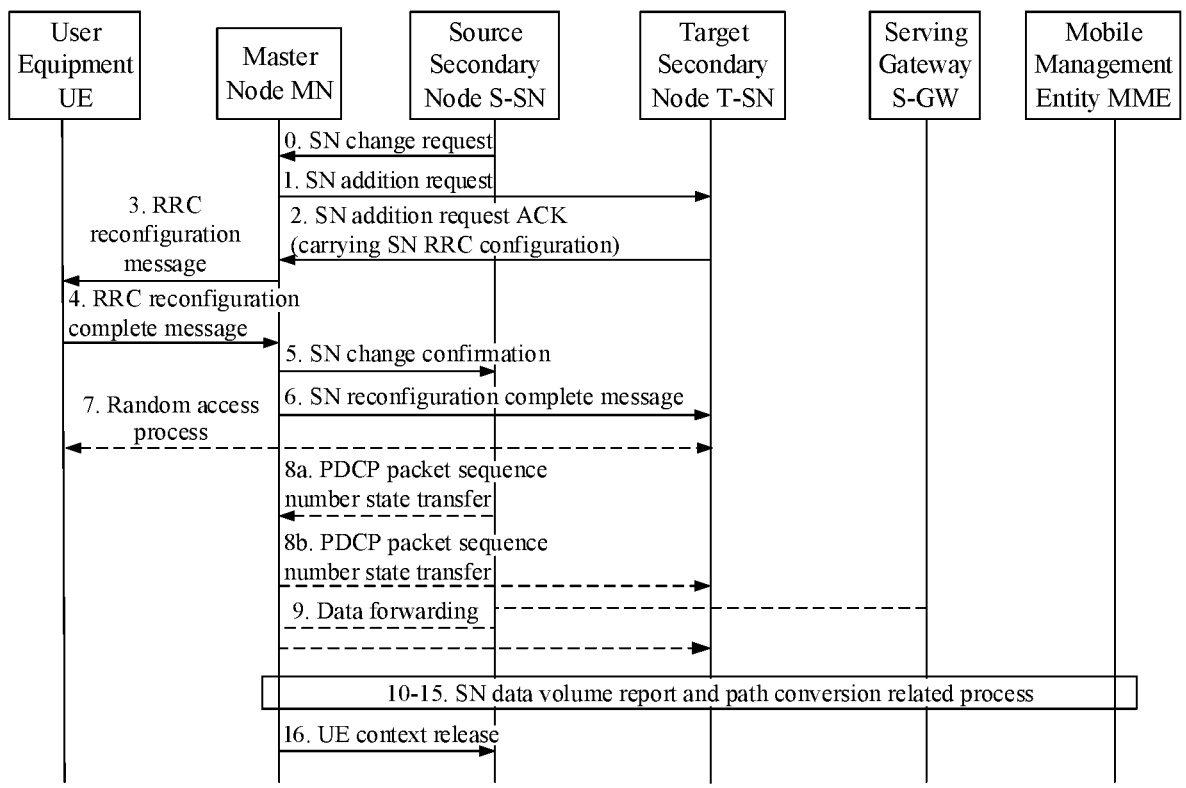
FIG. 4 is a schematic diagram of the existing process of SN change initiated by the SN provided by the first embodiment of the present application.

If the SN wants to change the connection between its own SN node and the UE to another SN, it will initiate the SN change process, such as the SN change process initiated by the SN connected to the EN-DC of the EPC, as shown in FIG. 4, which specifically includes:

Step 0) The S-SN initiates an SN change request to the MN;

It should be understood that the above S-SN is the SN that is connected to the above UE before the SN change initiated by the above SN;

Step 1) the MN sends an SN addition request to the Target Secondary Node (T-SN);

Step 2) T-SN replies to the MN with an SN addition request ACK (carrying the SN RRC configuration);

Step 3) the MN sends an RRC reconfiguration message to the UE, wherein the RRC reconfiguration message carries the configuration parameters related to the T-SN;

Step 4) the UE replies to the MN with an RRC reconfiguration complete message, wherein the RRC reconfiguration complete message carries the information about the completion of the T-SN configuration;

Step 5) the MN sends an SN change confirmation to the S-SN;

Step 6) the MN sends an SN reconfiguration complete message to the T-SN;

Step 7) a random access process between the UE and T-SN;

Steps 8-15) the data packet sequence number state transfer among base station nodes, the data forwarding, and the path conversion among core network nodes, etc.;

Step 16) the MN instructs the S-SN to release the UE context.

In the three scenarios described above, the process of adding/replacing the secondary nodes by the UE takes a long time, the data transmission delay may be caused, and the establishment time of dual/multiple connections is too long so that the probability of using dual connections to transmit data is reduced.

Therefore, some embodiments of the present application is a dual/multi-connectivity-based secondary node addition/replacement method and device.

In order to make the objects, technical solutions and advantages of the present application clearer, the present application will be further illustrated below in details with reference to the accompanying figures. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

First Embodiment

Figure 5:
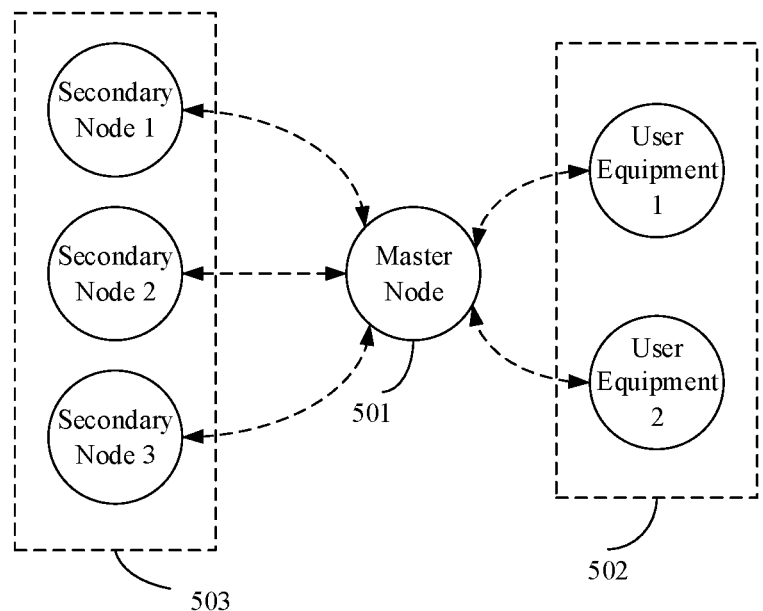
FIG. 5 is a schematic diagram of a system applied to the dual/multi-connectivity secondary node addition/replacement provided by the first embodiment of the present application.

As shown in FIG. 5, based on the scenario 1, scenario 2 and scenario 3 described above, this embodiment provides a system applied to the dual/multi-connectivity secondary node addition/replacement, which includes:

an MN 501 configured to: send an SN addition request to one or more SNs 503 in advance, receive the configuration information returned by the one or more SNs and send the configuration information of the one or more SNs to a UE 502, and obtain an SN satisfying a connectivity condition determined by the UE based on the measurement evaluation of the one or more SNs;

a UE 502 configured to: receive the configuration information of one or more SNs sent by the MN 501, perform the measurement evaluation on the one or more SNs 503 according to the configuration information of the one or more SNs to determine an SN satisfying the connectivity condition, notify the MN 501 of the SN satisfying the connectivity condition, and initiate a random access process to the SN satisfying the connectivity condition;

one or more SNs 503 configured to receive the SN addition request sent by the MN 501 in advance, return the configuration information to the MN, and establish a random connection with the UE when receiving the random access process initiated by the UE 502.

Based on the above system for secondary node addition/replacement, this embodiment proposes the following secondary node addition/replacement solution for the dual/multi-connection secondary node addition/replacement in the foregoing scenario 1, scenario 2 and scenario 3 to improve the efficiency of dual/multi-connection secondary node addition/replacement.

As an optional implementation, the MN is a master network node entity MN or a master serving cell under the master network node entity MN, and the SN is a secondary network node entity SN or a master serving cell under the secondary network node entity SN.

Figure 6:
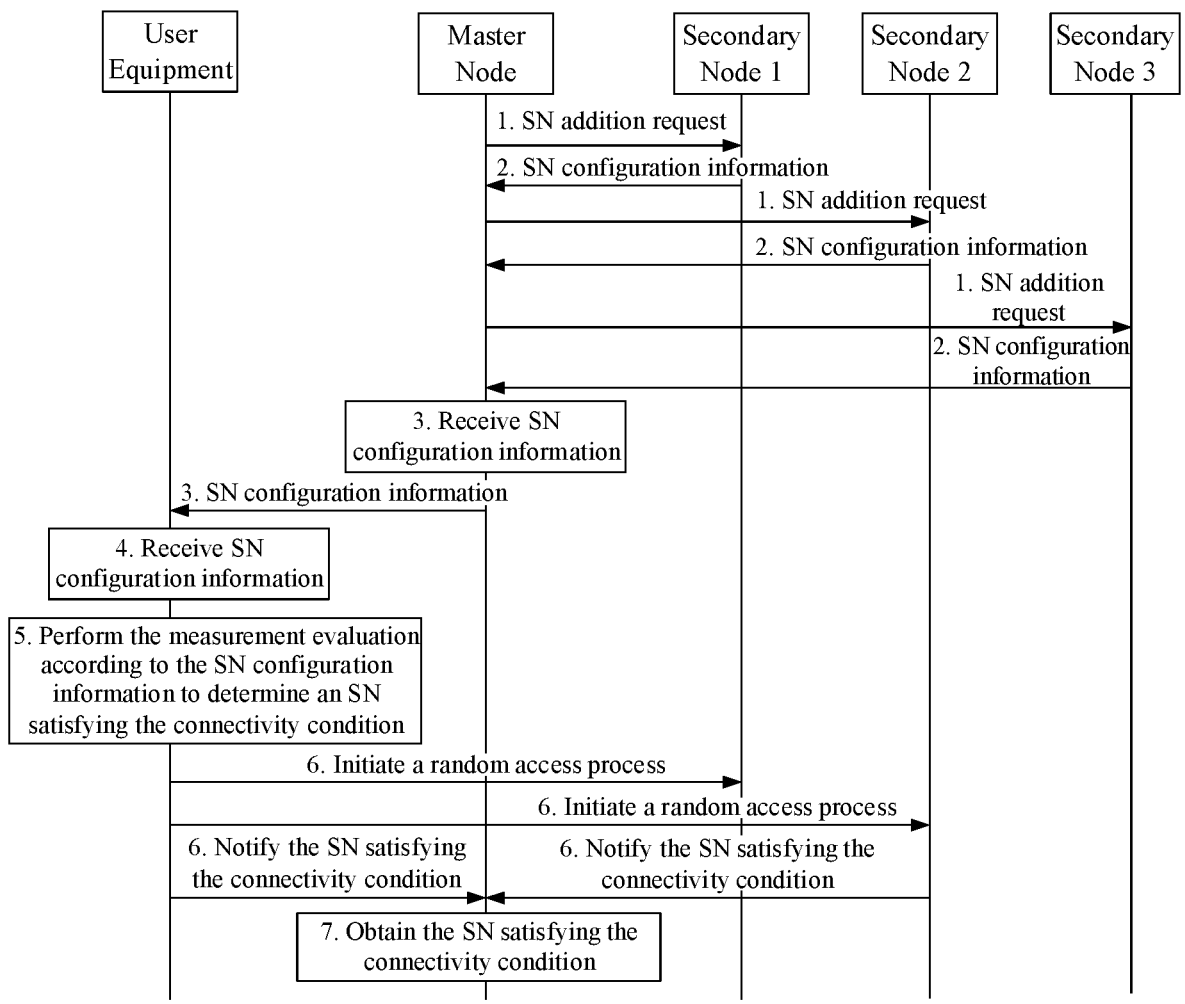
FIG. 6 is a schematic diagram of a specific process of dual/multi-connectivity secondary node addition/replacement provided by the first embodiment of the present application.

As shown in FIG. 6, a specific process of the above-mentioned secondary node addition/replacement solution will be illustrated below in conjunction with the interaction process of the above-mentioned MN, SN and UE.

Step 1) the MN sends an SN addition request to one or more SNs in advance.

As an optional implementation, the MN may send an SN addition request to one or more SNs based on an SN change request sent by an original SN that has been connected to the UE.

The MN may send an SN addition request to one or more SNs after receiving the early measurement result sent by the UE or when it has not received the early measurement result sent by the UE.

Before receiving the early measurement sent by the UE, the MN needs to send the relevant configuration information of the early measurement to the UE, wherein the relevant configuration information of the early measurement may, but not limited to, be sent to the UE through the dedicated signaling or system information, and the dedicated signaling may be but not limited to the RRC reconfiguration signaling or RRC release signaling.

The foregoing early measurement may be, but is not limited to, an RRM (Radio Resource Management) measurement in the connected state, or a measurement in which the UE enters the IDLE state/INACTIVE state.

The content of the foregoing early measurement result may include but not limited to measurement results for multiple SNs, and the content parameters of the foregoing early measurement result may include but not limited to:

the carrier frequency point information of the SN and the cell identification information of a cell under the SN;

the measurement results of the Reference Signal Receiving Power (RSRP), Reference Signal Receiving Quality (RSRQ) and Signal to Interference & Noise Ratio (SINR) for a serving cell of the SN and/or a neighboring cell of the serving cell of the SN;

the measurement result of the Beam-level (SSB (Synchronization Signal/PBCH Block)/CSI-RS(Channel State Information-Reference Signal)) corresponding to the SN.

Step 2) one or more SNs return the configuration information to the MN

As an optional implementation, the SN returns the configuration information to the MN through an SN addition request ACK.

The above SN configuration can be, but not limited to, configuring different content according to different SNs, or configuring the same content through negotiation/sharing among SN nodes (for example, RACH (Random Access Channel) configuration).

Step 3) the MN receives the configuration information returned by the one or more SNs, and sends the configuration information of the one or more SNs to a UE.

As an optional implementation, the MN receives the configuration information returned by the one or more SNs through an addition request confirmation message.

As an optional implementation, the MN may, but not limited to, send the configuration information of the one or more SNs to the UE through an RRC reconfiguration message according to any one of the following methods:

a) sending the configuration information of each SN in the configuration information of the one or more SNs to the UE by sending an RRC reconfiguration message separately;

b) sending the configuration information of the one or more SNs after being extracted or separately cascaded to the UE through an RRC reconfiguration message.

The configuration information of the SN can include, but not limited to, any one or more of:

a) bearer configuration information in SN;
b) SN security information;
c) SN access information, such as RACH configuration;
d) conditions that the UE needs to meet to access the SN.

Step 4) the UE receives the configuration information of one or more SNs sent by the MN As an optional implementation, the UE receives an RRC reconfiguration message sent by the MN, and obtains the configuration information of one or more SNs sent by the MN.

As an optional implementation, the UE receives an RRC reconfiguration message sent by the MN separately for configuration information of each SN in the configuration information of the one or more SNs; or receives an RRC reconfiguration message sent by the MN after extracting or separately cascading the configuration information of one or more SNs.

As an optional implementation, the UE sends an RRC reconfiguration complete message corresponding to the configuration information of the one or more SNs directly to the MN after receiving the RRC reconfiguration message sent by the MN.

As another optional implementation, the MN sends an SN reconfiguration complete message to the one or more SNs after receiving the RRC reconfiguration complete message corresponding to the configuration information of the one or more SNs from the UE.

As an optional implementation, after sending the configuration information of the one or more SNs to the UE through an RRC reconfiguration message, the MN receives an RRC reconfiguration complete message sent by the UE after initiating a random access process to the SN satisfying the connectivity condition.

Step 5) the UE performs the measurement evaluation on the one or more SNs according to the configuration information of the one or more SNs to determine an SN satisfying the connectivity condition.

As an optional implementation, the connectivity condition includes any one or more of:

a) measurement results of one or more measurement quantities of a cell under the SN meet corresponding preset threshold requirements;

b) measurement results of one or more measurement quantities of a cell under the SN are superior to measurement results of corresponding measurement quantities of a specified cell;

c) a timer used to time the SN measurement evaluation expires.

For example, in this embodiment, the connection establishment is initiated directly for the SN with the optimal measurement result of completing the SN configuration preparation after the timer expires, or the connection establishment of the SN is initiated after the time during which the measurement result for one or more SNs meets the predetermined threshold reaches the time length of the timer.

As an optional implementation, the measurement quantities include any one or more of:

a) Reference Signal Receiving Power (RSRP);
b) Reference Signal Receiving Quality (RSRQ);
c) Signal to Interference & Noise Ratio (SINR).

In this embodiment, when the measurement result value(s) of any one or more of the measurement quantities RSRP, RSRQ and SINR measured for a cell under the SN is/are higher than the measurement results of the corresponding measurement quantities RSRP, RSRQ and SINR measured for the specified cell, it is determined that the measurement result of one or more measurement quantities of the cell under the SN is superior to the measurement result of the corresponding measurement quantity of the specified cell, wherein those skilled in the art can perform the measurement on any one or more measurement quantities for the cell under the SN according to actual needs.

Step 6) the UE initiates a random access process to the SN satisfying the connectivity condition.

Here, it is assumed that the SNs satisfying the connectivity condition are SN1 and SN2, and it should be understood that the SN1 and SN2 may be any one or more SNs satisfying the connectivity condition.

As an optional implementation, after determining the SN satisfying the connectivity condition, the UE may, but not limited to, notify the MN of the SN satisfying the connectivity condition in the following way:

notifying the MN of the SN satisfying the connectivity condition through an RRC reconfiguration complete message sent to the MN; or notifying the MN of the SN satisfying the connectivity condition through an SN access request/notification/instruction message separately sent to the MN.

The SN access request/notification/instruction may, but not limited to, include the identity of the SN satisfying the condition or the identity of the cell to which the UE under the SN accesses.

As an optional implementation, after the MN sends the configuration information of the one or more SNs to the UE through an RRC reconfiguration message, the UE sends an RRC reconfiguration complete message corresponding to the configuration information of the SN satisfying the connectivity condition directly to the MN after determining the SN satisfying the connectivity condition.

Correspondingly, the MN receives the RRC reconfiguration complete message corresponding to the configuration information of the SN satisfying the connectivity condition sent by the UE.

As an optional implementation, after the UE initiates a random access process to the SN satisfying the connectivity condition, the SN sends the indication information indicating that the SN has completed the establishment of a random access with the UE to the MN.

Correspondingly, the MN receives the indication information indicating that the SN has completed the establishment of a random access with the UE sent by the SN satisfying the connectivity condition.

Correspondingly, as an optional implementation, the MN releases the SNs that have not been requested by the UE to establish connections after determining that the UE establishes a connection with the SN satisfying the connectivity condition.

Step 7) corresponds to the above step 6), where the MN obtains the SN satisfying the connectivity condition determined by the UE based on the measurement evaluation of the one or more SNs.

Corresponding to the above step 6), as an optional implementation, the MN obtains the determined SN satisfying the connectivity condition through an RRC reconfiguration complete message sent by the UE; or obtains the determined SN satisfying the connectivity condition through an SN access request/notification/instruction message sent separately by the UE.

As an optional implementation, the MN sends an SN reconfiguration complete message to the SN satisfying the connectivity condition after obtaining the determined SN satisfying the connectivity condition through the RRC reconfiguration complete message sent by the UE.

As an optional implementation, the MN may further receive the determined SN satisfying the connectivity condition notified after the SN satisfying the connectivity condition establishes a connection with the UE.

Correspondingly, after the SN satisfying the connectivity condition establishes a connection with the UE, the SN satisfying the connectivity condition is notified to the MN.

As an optional implementation, the MN receives an RRC reconfiguration complete message corresponding to the configuration information of the SN satisfying the connectivity condition sent by the UE after initiating a random access process with the SN satisfying the connectivity condition; and the MN sends an SN change confirmation message to an original SN that has been connected to the UE previously after receiving the RRC reconfiguration complete message corresponding to the configuration information of the SN satisfying the connectivity condition sent by the UE.

As an optional implementation, the MN sends an SN change confirmation message to the original SN that has been connected to the UE previously after receiving an instruction that the UE establishes a connection with the SN satisfying the connectivity condition sent by the UE or after receiving an instruction to establish a connection with the UE sent by the SN satisfying the connectivity condition.

Several specific implementations of the dual/multi-connectivity secondary node addition/replacement solution are given below.

Specific implementation 1.

Figure 7:
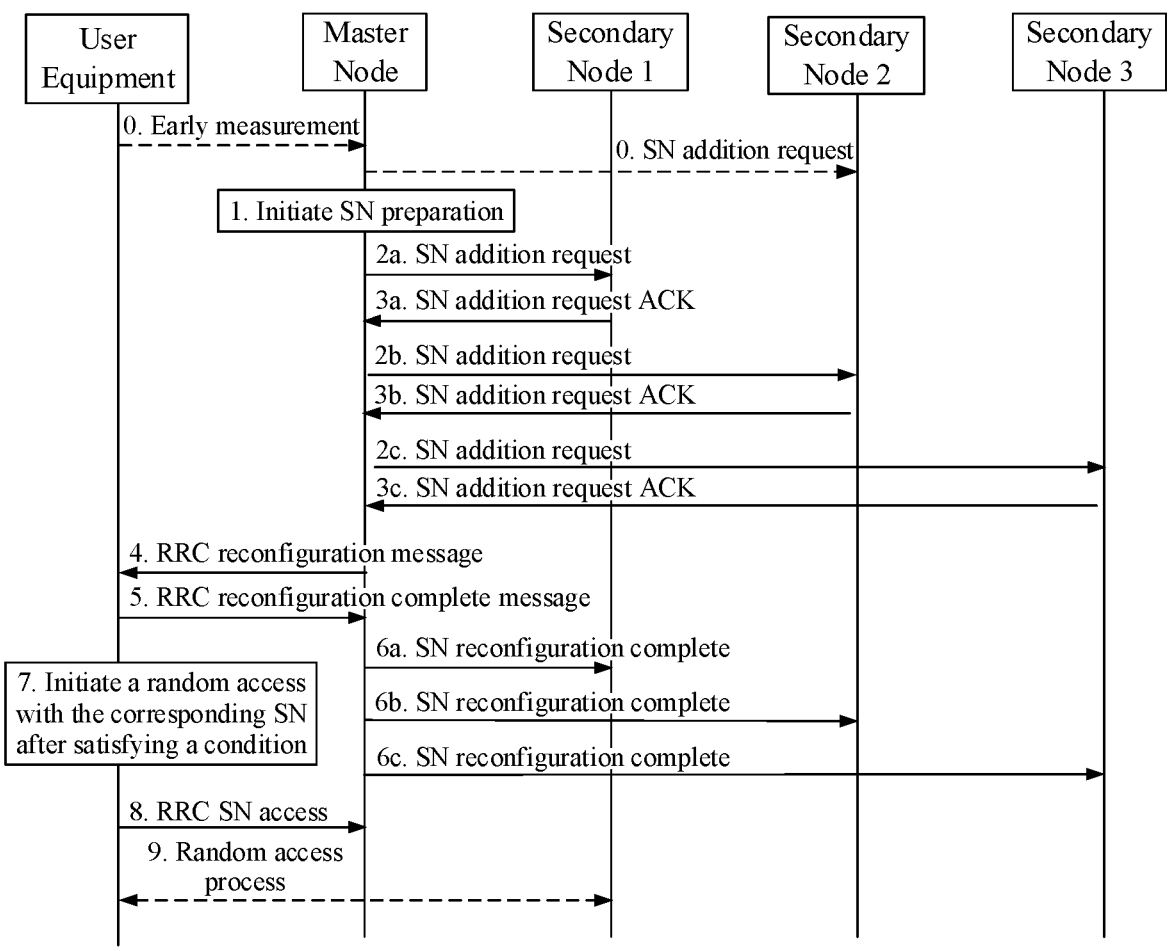
FIG. 7 is a schematic diagram of a dual/multi-connectivity secondary node addition/replacement process provided by a specific implementation 1 in the first embodiment of the present application.

As an optional implementation, the MN may initiate an SN preparation process to multiple SNs after receiving the early measurement result sent by the UE, as shown in FIG. 7, which specifically includes.

Step 0) sending an SN addition request to one or more SNs based on an early measurement result reported by the UE.

The above step 0) is an optional step (marked by dotted lines in FIG. 7), and those skilled in the art can choose whether to implement it according to actual needs.

Step 1) the MN initiates an SN preparation process to multiple SNs.

The above step of initiating the SN preparation process may be performed after receiving the early measurement result sent by the UE, or may be performed when the early measurement result sent by the UE is not received.

Step 2a/b/c) the MN sends SN addition requests to multiple SNs.

Step 3a/b/c) multiple SNs feed back SN addition request ACKs carrying the configuration information of their respective SNs to the MN.

Step 4) the MN sends an RRC reconfiguration message to the UE after receiving the SN addition request ACK from one or more SNs.

Step 5) the MN receives an RRC reconfiguration complete message sent by the UE.

Step 6a/b/c) the MN sends an SN reconfiguration complete message to each SN of which the configuration is successfully saved/applied by the UE to complete the SN configuration preparation process for one or more SNs.

At this time, the UE has configured a protocol stack for the SN that has completed the SN preparation process, and is ready to establish connections with the one or more SNs.

Step 7) the UE evaluates and considers that the secondary node SN1 satisfies the connectivity condition based on the measurement result, and decides to establish a wireless connection with the SN1.

It should be understood that it is SN1 in this embodiment, but it may actually be other SN or multiple SNs.

The SN(s) satisfying the connectivity condition may be one or more of multiple SNs that complete the SN configuration preparation process.

It should be understood that there is no sequence of steps 6a/b/c) and step 7), and those skilled in the art can set the sequence of steps 6a/b/c) and step 7 according to actual needs.

Step 8) the UE sends an SN access request/notification/instruction of the SN satisfying the connectivity condition to the MN.

Optionally, the SN access request/notification/instruction may be, but not limited to, an RRC SN access message.

Step 9) the UE initiates a random access process to the SN satisfying the connectivity condition.

It should be understood that the sequence of the above step 8) and step 9) can be exchanged, that is, the UE can send the SN access request/notification/instruction for the SN to the MN after completing the random access with the SN, or can send the SN access request/notification/indication for the SN to the MN directly.

The above-mentioned process of the specific implementation 1 can be used for the SN addition or SN replacement, namely:

1) For the SN addition process, the MN prepares multiple possible SNs for the UE; when the UE evaluates and considers that a certain SN or multiple SNs satisfy the connectivity condition, it gives the MN an instruction and accesses to the SN, and then the MN may request to shunt the transmitted data to the SN;

2) For the SN change process, the MN prepares multiple possible target SNs for the UE; when the UE evaluates and considers that a certain target SN/multiple target SNs satisfy the predetermined condition, it gives the MN an instruction and accesses to the target SN. Then the MN may request to shunt the transmitted data to the target SN, and request to delete the connection between the original SN and the UE or the UE context information stored in the original SN.

In the process in the specific implementation 1 described above, since the SN has completed the pre-configuration preparation process before the UE performs the measurement evaluation, the UE can directly access to the SN at a very fast speed and use the SN resources to receive/transmit data when the user service quality of the cell under one or more SNs becomes better.

Specific implementation 2.

Figure 8:
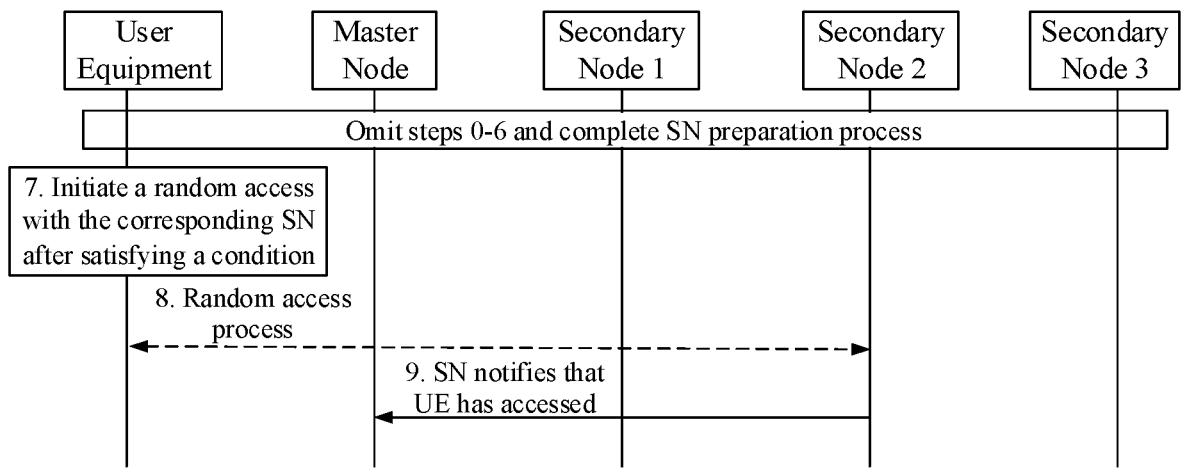
FIG. 8 is a schematic diagram of a dual/multi-connectivity secondary node addition/replacement process provided by a specific implementation 2 in the first embodiment of the present application.

The specific implementation 2 is another method for notifying the MN for the SN satisfying the condition after the SN completes the configuration preparation process, which is different from the specific implementation 1, and as shown in FIG. 8, which specifically includes.

Steps 0-6) are exactly the same as steps 0-6) in the above specific implementation 1.

Step 7) the UE evaluates and considers that the SN1 satisfies the connectivity condition based on the measurement result, and decides to establish a wireless connection with the SN1.

It should be understood that the SN1 in this specific embodiment may actually be other SN or multiple SNs.

Step 8) the UE initiates the random access to the SN satisfying the condition to establish a wireless connection.

Step 9) after the SN that has completed the SN configuration preparation process accesses to the UE, the SN notifies the MN that it has accessed to the UE.

Specific implementation 3.

Figure 9:
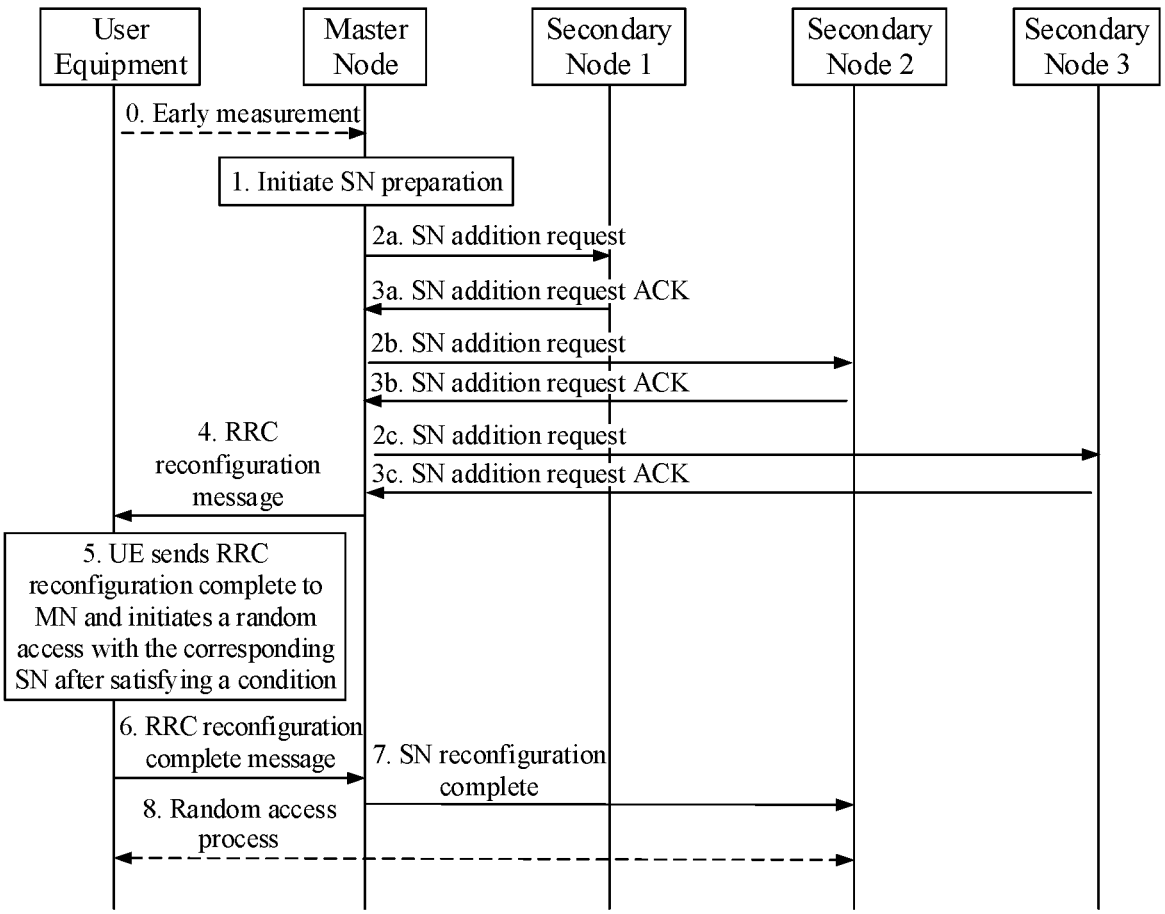
FIG. 9 is a schematic diagram of a dual/multi-connectivity secondary node addition/replacement process provided by a specific implementation 3 in the first embodiment of the present application.

As shown in FIG. 9, for the SN addition/change initiated by the MN, similar to the above specific implementation 1, the MN can initiate the SN configuration preparation process to multiple SNs after receiving the early measurement result sent by the UE, and then the process in which the UE selects an SN to establish a connection is as follows.

Steps 0-4) are exactly the same as steps 0-4) in the above specific implementation 1.

Step 5) the UE evaluates and considers that the SN2 satisfies the connectivity condition based on the measurement result, and decides to establish a wireless connection with the SN2.

It should be understood that the SN2 in this embodiment may actually be other SN or multiple SNs; and the SN(s) satisfying the connectivity condition may be one or more of multiple SNs that complete the SN configuration preparation process.

Step 6) the UE sends an RRC reconfiguration complete message to the MN.

The RRC reconfiguration complete message includes an SN access request/notification/instruction for one or more SNs that satisfy the connectivity condition.

Step 7) the MN instructs the UE to send an SN reconfiguration complete message to one or more SNs that require the connection establishment.

Step 8) the UE initiates a random access process to one or more SNs satisfying the connectivity condition.

It should be understood that there is no fixed sequence relationship between the above step 8) and the above step 6), and those skilled in the art can set according to actual needs.

The above-mentioned process of the specific implementation 3 can be used for the SN addition or SN replacement, including:

1) For the SN addition process, the MN prepares multiple possible SNs for the UE; when the UE evaluates and considers that a certain SN or multiple SNs satisfy the connectivity condition, it gives the MN an instruction and accesses to the SN, and then the MN may request to shunt the transmitted data to the SN;

2) For the SN change process, the MN prepares multiple possible target SNs for the UE; when the UE evaluates and considers that a certain target SN/multiple target SNs satisfy the connectivity condition, it gives the MN an instruction and accesses to the target SN; and then the MN may request to shunt the transmitted data to the target SN and request to delete the original SN.

In the process in the specific implementation 3 described above, since the SN has been determined and the SN configuration preparation process has been completed in advance, the UE can access to the SN at a very fast speed and use the SN resources to receive/send data when the user service quality of the cell under one or more SNs becomes better.

Specific implementation 4.

Figure 10:
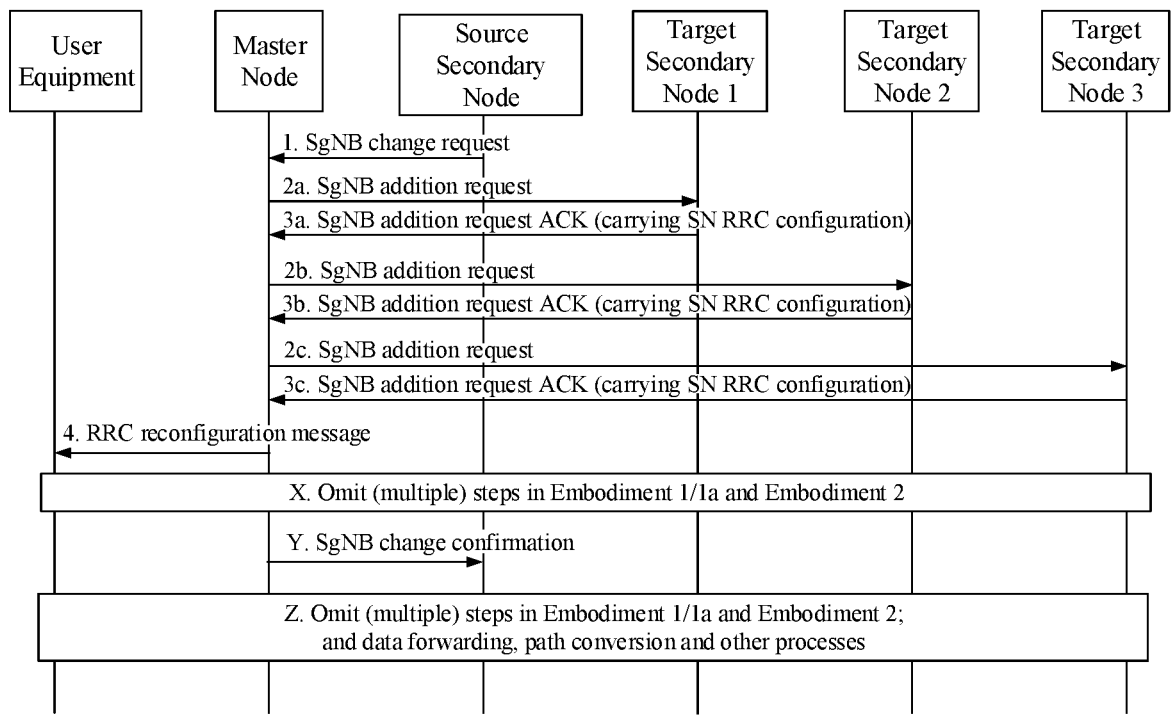
FIG. 10 is a schematic diagram of a dual/multi-connectivity secondary node addition/replacement process provided by a specific implementation 4 in the first embodiment of the present application.

The MN initiates the SN addition process to multiple SNs. When the UE selects an SN according to the connectivity condition, and when the SN feels that it cannot meet the UE's data transmission requirement or a better SN can provide services for the UE, the SN can initiate an SN change process, as shown in FIG. 10, which specifically includes.

Step 1) the original SN sends an SN change request to the MN.

The content of the SN change request may include but not limited to:

identification information of one or more Target Secondary Nodes (T-SNs), carrier frequency point information, cell identification information;

SCG/SN configuration information;

measurement results of RSRP, RSRQ, SINR for a serving cell and/or a neighboring cell of the serving cell; and Beam-level (SSB/CSI-RS) measurement results.

Step 2 a/b/c) the MN makes a decision after receiving a request sent from the original S-SN, and can initiate SN addition requests to multiple SNs.

Here, there may be one or more S-SNs.

Step 3a/b/c) multiple SNs feed back SN addition request ACKs carrying the configuration information of their respective SNs to the MN.

The above SN configuration can be, but not limited to, configuring different content according to different SNs, or configuring the same content through negotiation/sharing among SN nodes (for example, RACH configuration).

Step 4) is exactly the same as step 4) in the above specific implementation 1/specific implementation 2/specific implementation 3, where the MN sends an RRC reconfiguration message to the UE after receiving the feedback(s) from one or more SNs.

Step X and Step Z: consistent with the steps after the MN sends the RRC reconfiguration message in the above specific implementation 1/specific implementation 2/specific implementation 3.

Step Y: the steps in which the RRC reconfiguration is completed, the MN indicates to the SN that the SN reconfiguration is completed, the UE selects the SN satisfying the condition, the random access process between the UE and SN is performed, and the MN is notified of the connection establishment between the UE and SN after the step 4) (RRC reconfiguration message) can use the steps in the above specific implementation 1/specific implementation 2/specific implementation 3.

For the step in which "the MN sends an SN change confirmation message to the original SN" specific to "the SN change initiated by the SN", it needs to be placed between different steps for different multiplexing of the above specific implementation 1/specific implementation 2/specific implementation 3. The details are as follows.

For the above specific implementation 1: after the step 8, the MN may send an SN change confirmation to the original SN after receiving an instruction sent from the UE to establish a connection between the UE and the SN.

For the above specific implementation 2: after the step 9, the MN may send an SN change confirmation to the original SN after receiving an instruction sent from the SN to establish a connection between the UE and the SN.

For the above specific implementation 3: the MN may send an SN change confirmation to the original SN after receiving the RRC reconfiguration complete message of step 6.

Specific implementation 5: the MN initiates connection release to SNs that are not requested by the UE.

Figure 11:
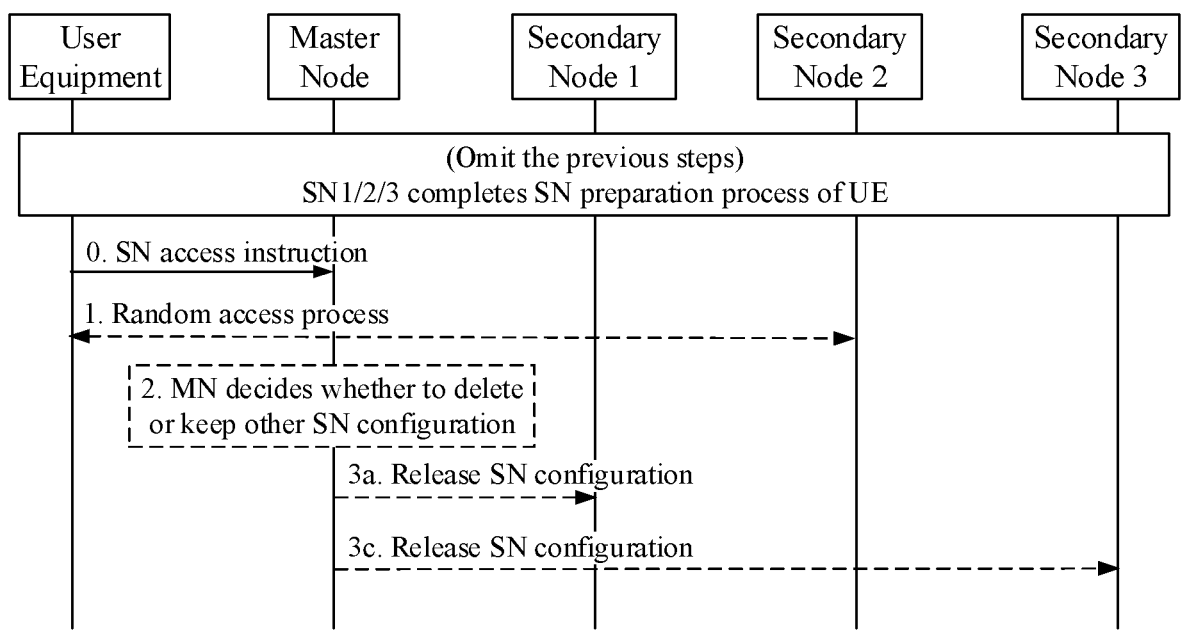
FIG. 11 is a schematic diagram of a dual/multi-connectivity secondary node addition/replacement process provided by a specific implementation 5 in the first embodiment of the present application.

After the UE establishes a connection/connections with any one or more SNs that have completed the SN configuration preparation process, as an optional implementation, the MN may decide whether to initiate a release process to other SNs that have not established connections with the UE. This process is applicable to all the foregoing specific implementations, as shown in FIG. 11, which specifically includes.

Step 0) the UE sends an SN access request/notification/instruction to the MN.

In the specific implementation 5, this step may be: the SN access request/notification/instruction in the above specific implementation 1 (step 8), or the RRC reconfiguration complete message in the above specific implementation 3 (step 6), or the SN notifies the MN that the UE and the SN have established a connection (SN access instruction) after the UE completes the random access with the SN satisfying the condition in the specific implementation 2.

Step 1) the UE initiates a random access process to the SN2 satisfying the connectivity condition.

In a specific implementation, the above step 1 may be before step 0, that is, the UE or the above SN sends an SN access instruction to the MN after the UE is allowed to complete the random access with the SN satisfying the connectivity condition.

Step 2) the MN decides whether to delete or keep other SN configuration (SN1 and SN3 in this specific implementation).

The above step 2 is an optional step, and those skilled in the art can choose whether to implement the above step 2 according to actual needs.

Step 3a/c) if the MN decides to delete other SN configuration, it sends an SN release request or a UE context release request/instruction to the corresponding SN that has not established a connection with the UE, and the SN may reply to the MN with a release confirmation feedback after releasing the configuration/context.

The above step 3a/c) is an optional step, and those skilled in the art can choose whether to implement it according to actual needs.

It should be understood that, for different wireless communication systems (such as Long Term Evolution (LTE)/4G wireless connection Elte/5G wireless connection NR) or scenarios (such as Dual-Connectivity connected to EPC: EN-DC (E-UTRA-NR-Dual Connectivity), NE-DC (NR-E-UTRAN-Dual Connectivity), NR-NR DC (NR-NR-Dual Connectivity)), etc. The names of the MN and the SN may be different (for example, the SN is called SN/SgNB/SeNB, etc.), and the signaling names between nodes may also be different. The specific implementations 1 to 5 provided in this embodiment are only examples for illustration, and all the implementations based on the principle of the dual/multi-connectivity-based secondary node addition/replacement method proposed based on the present application are within the protection scope of the present application.

Second Embodiment

Figure 12:
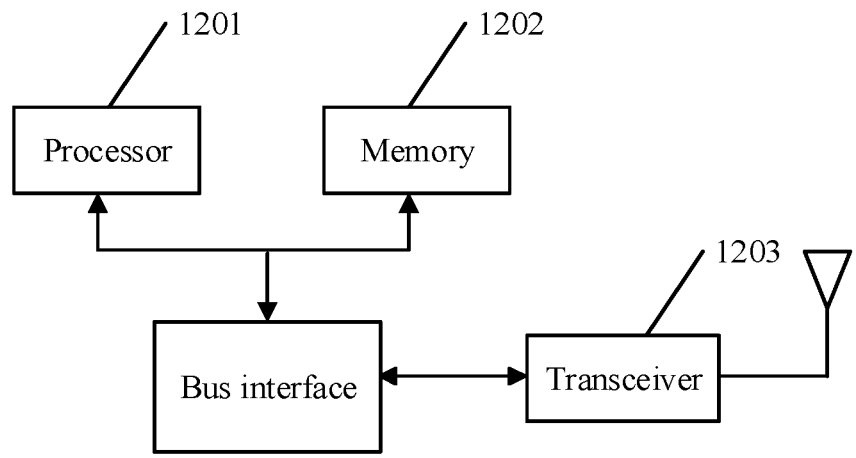
FIG. 12 is a schematic diagram of a terminal device for dual/multi-connectivity secondary node addition/replacement provided by a second embodiment of the present application.

As shown in FIG. 12, based on the same inventive concept, some embodiments provide a terminal device for a secondary node addition/replacement method based on dual/multi-connectivity scenario. The device includes: a processor 1201, a memory 1202 and a transceiver 1203.

The processor 1201 is responsible for managing the bus architecture and general processing, and the memory 1202 may store the data used by the processor 1201 when performing the operations. The transceiver 1203 is configured to receive and send the data under the control of the processor 1201.

The bus architecture may include any numbers of interconnected buses and bridges, and specifically link various circuits of one or more processors represented by the processor 1201 and the memory represented by the memory 1202. The bus architecture may further link various other circuits such as peripheral device, voltage regulator and power management circuit, which are all well known in the art and thus will not be further described again herein. The bus interface provides an interface. The processor 1201 is responsible for managing the bus architecture and general processing, and the memory 1202 may store the data used by the processor 1201 when performing the operations.

The procedure disclosed by the embodiment of the present application may be applied in the processor 1201 or implemented by the processor 1201. In the implementation process, each step of the signal processing flow may be completed by the integrated logic circuit of hardware in the processor 1201 or the instruction in the form of software. The processor 1201 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1202, and the processor 1201 reads the information in the memory 1202 and completes the steps of the signal processing flow in combination with its hardware.

Here, the memory 1202 is configured to store a program executable by the processor 1201, and the processor 1201 is configured to read the program in the memory 1201 and perform the following steps:

receiving the configuration information of one or more SNs sent by an MN;

performing a measurement evaluation on the one or more SNs according to the configuration information of the one or more SNs to determine an SN satisfying a connectivity condition;

initiating a random access process to the SN satisfying the connectivity condition.

Optionally, the MN is a master network node entity MN or a master serving cell under the master network node entity MN, and the SN is a secondary network node entity SN or a master serving cell under the secondary network node entity SN.

Optionally, the processor is specifically configured to: notify the MN of the SN satisfying the connectivity condition through an RRC reconfiguration complete message sent to the MN; or notify the MN of the SN satisfying the connectivity condition through an SN access request/notification/instruction message separately sent to the MN.

Optionally, the connectivity condition includes any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires.

In a possible implementation, the measurement quantities include any one or more of:

Reference Signal Receiving Power (RSRP);

Reference Signal Receiving Quality (RSRQ);

Signal to Interference & Noise Ratio (SINR).

Optionally, the processor 1201 is specifically configured to: receive an RRC reconfiguration message sent by the MN, and obtain the configuration information of one or more SNs sent by the MN.

Optionally, the processor 1201 is specifically configured to: receive an RRC reconfiguration message sent by the MN separately for configuration information of each SN in the configuration information of the one or more SNs; or receive an RRC reconfiguration message sent by the MN after extracting or separately cascading the configuration information of one or more SNs.

Optionally, the processor 1201 is further configured to: send an RRC reconfiguration complete message corresponding to the configuration information of the one or more SNs directly to the MN after receiving the RRC reconfiguration message sent by the master node; or send an RRC reconfiguration complete message corresponding to the configuration information of the SN satisfying the connectivity condition to the MN after determining the SN satisfying the connectivity condition.

Figure 13:
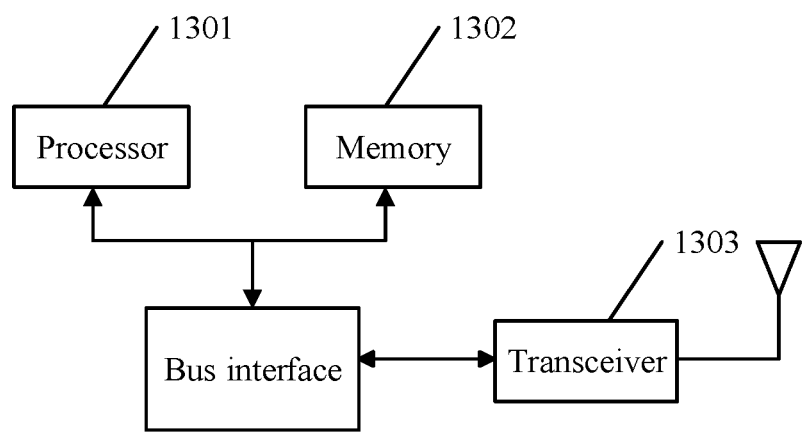
FIG. 13 is a schematic diagram of a network-side device for dual/multi-connectivity secondary node addition/replacement provided by the second embodiment of the present application.

As shown in FIG. 13, based on the same inventive concept, this embodiment further provides a network-side device for a secondary node addition/replacement method based on dual/multi-connectivity scenario. The device includes: a processor 1301, a memory 1302 and a transceiver 1303.

The processor 1301 is responsible for managing the bus architecture and general processing, and the memory 1302 may store the data used by the processor 1301 when performing the operations. The transceiver 1303 is configured to receive and send the data under the control of the processor 1301.

The bus architecture may include any numbers of interconnected buses and bridges, and specifically link various circuits of one or more processors represented by the processor 1301 and the memory represented by the memory 1302. The bus architecture may further link various other circuits such as peripheral device, voltage regulator and power management circuit, which are all well known in the art and thus will not be further described again herein. The bus interface provides an interface. The processor 1301 is responsible for managing the bus architecture and general processing, and the memory 1302 may store the data used by the processor 1301 when performing the operations.

The procedure disclosed by embodiments of the present application may be applied in the processor 1301 or implemented by the processor 1301. In the implementation process, each step of the signal processing flow may be completed by the integrated logic circuit of hardware in the processor 1301 or the instruction in the form of software. The processor 1301 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the present application. The general-purpose processor may be a microprocessor or any conventional processor or the like. The steps of the method disclosed in combination with the embodiments of the present application may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 1302, and the processor 1301 reads the information in the memory 1302 and completes the steps of the signal processing flow in combination with its hardware.

Here, the memory 1302 is configured to store a program executable by the processor 1301, and the processor 1301 is configured to read the program in the memory 1301 and perform the following steps:

sending an SN addition request to one or more SNs in advance;

receiving configuration information returned by the one or more SNs, and sending the configuration information of the one or more SNs to a UE.

Optionally, the SN is a secondary network node entity SN or a master serving cell under the secondary network node entity SN.

Optionally, the processor is further configured to: obtain an SN satisfying a connectivity condition determined by the UE based on a measurement evaluation of the one or more SNs; or receive the determined SN satisfying the connectivity condition notified after the SN satisfying the connectivity condition establishes a connection with the UE.

Optionally, the processor 1301 is further configured to: release SNs that have not been requested by the UE to establish connections after determining that the UE establishes a connection with the SN satisfying the connectivity condition.

In a possible implementation, the connectivity condition includes any one or more of:
measurement results of one or more measurement quantities of a cell under the SN meet corresponding preset threshold requirements;
measurement results of one or more measurement quantities of a cell under the SN are superior to measurement results of corresponding measurement quantities of a specified cell;
a timer used to time the SN measurement evaluation expires.

In a possible implementation, the measurement quantities include any one or more of:
Reference Signal Receiving Power (RSRP);
Reference Signal Receiving Quality (RSRQ);
Signal to Interference & Noise Ratio (SINR).

Optionally, the processor 1301 is specifically configured to: obtain the determined SN satisfying the connectivity condition through an RRC reconfiguration complete message sent by the UE; or
obtain the determined SN satisfying the connectivity condition through an SN access request/notification/instruction message sent separately by the UE.

Optionally, after obtaining the determined SN satisfying the connectivity condition through the RRC reconfiguration complete message sent by the UE, the processor 1301 is further configured to:
send an SN reconfiguration complete message to the SN satisfying the connectivity condition.

Optionally, the processor is further configured to: obtain the SN satisfying the connectivity condition determined by the UE based on a measurement evaluation of the one or more SNs; or send an SN change confirmation message to an original SN that has been connected to the UE previously after receiving the determined SN satisfying the connectivity condition notified after the SN satisfying the connectivity condition establishes a connection with the UE.

Optionally, the processor 1301 is specifically configured to: send an SN addition request to one or more SNs based on an early measurement result reported by the UE.

In a possible implementation, the processor is specifically configured to:
send an SN addition request to one or more SNs based on an SN change request sent by an original SN that has been connected to the UE.

Optionally, the processor 1301 is specifically configured to: receive the configuration information returned by the one or more SNs through an addition request confirmation message;
send the configuration information of the one or more SNs to the UE through an RRC reconfiguration message.

Optionally, the processor 1301 is specifically configured to: send the configuration information of each SN in the configuration information of the one or more SNs to the UE by sending an RRC reconfiguration message separately; or
send the configuration information of the one or more SNs after being extracted or separately cascaded to the UE through an RRC reconfiguration message.

Optionally, the processor 1301 is further configured to: receive an RRC reconfiguration complete message corresponding to the configuration information of the one or more SNs sent directly by the UE after receiving the RRC reconfiguration message; or
receive an RRC reconfiguration complete message corresponding to the configuration information of the SN satisfying the connectivity condition sent by the UE after determining the SN satisfying the connectivity condition.

Optionally, the processor is further configured to: receive the indication information indicating that the SN has completed establishment of a random access with the UE sent by the SN satisfying the connectivity condition.

In a possible implementation, after receiving the RRC reconfiguration complete message corresponding to the configuration information of the one or more SNs sent directly by the UE after receiving the RRC reconfiguration message, the processor 1301 is further configured to:
send an SN reconfiguration complete message to the one or more SNs.

Optionally, after receiving the RRC reconfiguration complete message corresponding to the configuration information of the SN satisfying the connectivity condition sent by the UE after determining the SN satisfying the connectivity condition, the processor 1301 is further configured to:
send an SN change confirmation message to an original SN that has been connected to the UE previously.

Third Embodiment

Figure 14:
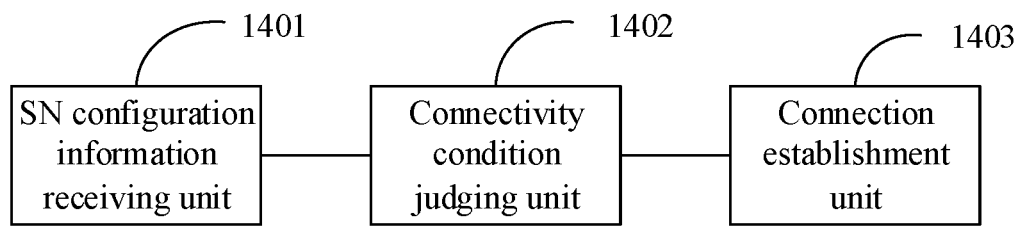
FIG. 14 is a schematic diagram of a terminal apparatus for dual/multi-connectivity secondary node addition/replacement provided by the second embodiment of the present application.

As shown in FIG. 14, based on the same inventive concept, this embodiment provides a terminal apparatus for a secondary node addition/replacement method based on dual/multi-connectivity scenario. The apparatus includes:
an SN configuration information receiving unit 1401 configured to receive the configuration information of one or more SNs sent by an MN;
a connectivity condition judging unit 1402 configured to perform a measurement evaluation on the one or more SNs according to the configuration information of the one or more SNs to determine an SN satisfying a connectivity condition;
a connection establishment unit 1403 configured to initiate a random access process to the SN satisfying the connectivity condition.

Optionally, the MN is a master network node entity MN or a master serving cell under the master network node entity MN, and the SN is a secondary network node entity SN or a master serving cell under the secondary network node entity SN.

Optionally, the connection establishment unit is further configured to: notify the MN of the SN satisfying the connectivity condition through an RRC reconfiguration complete message sent to the MN; or
notify the MN of the SN satisfying the connectivity condition through an SN access request/notification/instruction message separately sent to the MN.

Optionally, the connectivity condition includes any one or more of:
measurement results of one or more measurement quantities of a cell under the SN meet corresponding preset threshold requirements;
measurement results of one or more measurement quantities of a cell under the SN are superior to measurement results of corresponding measurement quantities of a specified cell;
a timer used to time the SN measurement evaluation expires.

Optionally, the measurement quantities include any one or more of:
Reference Signal Receiving Power (RSRP);
Reference Signal Receiving Quality (RSRQ);
Signal to Interference & Noise Ratio (SINR).

Optionally, the SN configuration information receiving unit is configured to: receive an RRC reconfiguration message sent by the MN, and obtain the configuration information of one or more SNs sent by the MN.

Optionally, the SN configuration information receiving unit is configured to: receive an RRC reconfiguration message sent by the MN separately for configuration information of each SN in the configuration information of the one or more SNs; or receive an RRC reconfiguration message sent by the MN after extracting or separately cascading the configuration information of one or more SNs.

Optionally, the connection establishment unit is further configured to: send an RRC reconfiguration complete message corresponding to the configuration information of the one or more SNs directly to the MN after receiving the RRC reconfiguration message sent by the master node; or send an RRC reconfiguration complete message corresponding to the configuration information of the SN satisfying the connectivity condition to the MN after determining the SN satisfying the connectivity condition.

Figure 15:
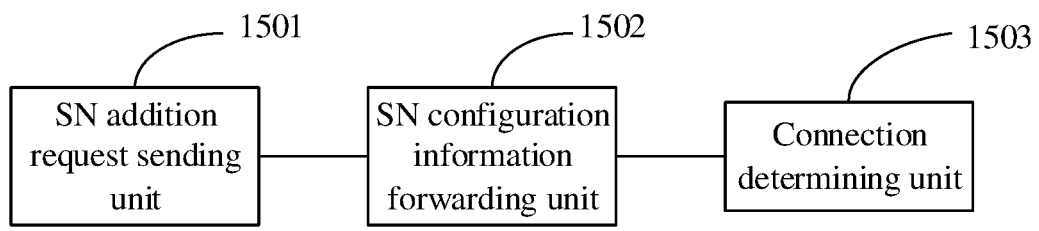
FIG. 15 is a schematic diagram of a network-side apparatus for dual/multi-connectivity secondary node addition/replacement provided by the second embodiment of the present application.

As shown in FIG. 15, based on the same inventive concept, this embodiment further provides a network-side apparatus for a secondary node addition/replacement method based on dual/multi-connectivity scenario. The apparatus includes:

an SN addition request sending unit 1501 configured to send an SN addition request to one or more SNs in advance;

an SN configuration information forwarding unit 1502 configured to receive the configuration information returned by the one or more SNs, and send the configuration information of the one or more SNs to a UE.

Optionally, the SN is a secondary network node entity SN or a master serving cell under the secondary network node entity SN.

Optionally, the apparatus further includes:

a connection determining unit 1503 configured to: obtain an SN satisfying a connectivity condition determined by the UE based on a measurement evaluation of the one or more SNs; or receive the determined SN satisfying the connectivity condition notified after the SN satisfying the connectivity condition establishes a connection with the UE.

Optionally, the connection determining unit is further configured to: release SNs that have not been requested by the UE to establish connections after determining that the UE establishes a connection with the SN satisfying the connectivity condition.

Optionally, the connectivity condition includes any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires.

In a possible implementation, the measurement quantities include any one or more of:

Reference Signal Receiving Power (RSRP);
Reference Signal Receiving Quality (RSRQ);
Signal to Interference & Noise Ratio (SINR).

Optionally, the connection determining unit is configured to: obtain the determined SN satisfying the connectivity condition through an RRC reconfiguration complete message sent by the UE; or obtain the determined SN satisfying the connectivity condition through an SN access request/notification/instruction message sent separately by the UE.

Optionally, after obtaining the determined SN satisfying the connectivity condition through the RRC reconfiguration complete message sent by the UE, the connection determining unit is further configured to: send an SN reconfiguration complete message to the SN satisfying the connectivity condition.

Optionally, the connection determining unit is further configured to: obtain the SN satisfying the connectivity condition determined by the UE based on a measurement evaluation of the one or more SNs; or send an SN change confirmation message to an original SN that has been connected to the UE previously after receiving the determined SN satisfying the connectivity condition notified after the SN satisfying the connectivity condition establishes a connection with the UE.

Optionally, the SN addition request sending unit is configured to: send an SN addition request to one or more SNs based on an early measurement result reported by the UE.

Optionally, the processor is specifically configured to:
send an SN addition request to one or more SNs based on an SN change request sent by an original SN that has been connected to the UE.

Optionally, the SN configuration information forwarding unit is configured to: receive the configuration information returned by the one or more SNs through an addition request confirmation message;

send the configuration information of the one or more SNs to the UE through an RRC reconfiguration message.

Optionally, the SN configuration information forwarding unit is configured to: send the configuration information of each SN in the configuration information of the one or more SNs to the UE by sending an RRC reconfiguration message separately; or send the configuration information of the one or more SNs after being extracted or separately cascaded to the UE through an RRC reconfiguration message.

Optionally, the connection determining unit is further configured to: receive an RRC reconfiguration complete message corresponding to the configuration information of the one or more SNs sent directly by the UE after receiving the RRC reconfiguration message; or receive an RRC reconfiguration complete message corresponding to the configuration information of the SN satisfying the connectivity condition sent by the UE after determining the SN satisfying the connectivity condition.

Optionally, the connection determining unit is further configured to: receive the indication information indicating that the SN has completed establishment of a random access with the UE sent by the SN satisfying the connectivity condition.

Optionally, after receiving the RRC reconfiguration complete message corresponding to the configuration information of the SN satisfying the connectivity condition sent by the UE after determining the SN satisfying the connectivity condition, the connection determining unit is further configured to: send an SN reconfiguration complete message to the one or more SNs.

Optionally, after receiving the RRC reconfiguration complete message corresponding to the configuration information of the SN satisfying the connectivity condition sent by the UE after initiating a random access process with the SN satisfying the connectivity condition, the connection determining unit is further configured to: send an SN change confirmation message to an original SN that has been connected to the UE previously.

Fourth Embodiment

An embodiment of the present application provides a computer-readable non-volatile storage medium including program codes. When the above-mentioned program codes run on a computing device, the above-mentioned program codes are configured to cause the above-mentioned computing terminal to perform the steps of the above method of the first embodiment of the present application.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A dual/multi-connectivity-based secondary node addition/replacement method, comprises:
   receiving configuration information of one or more Secondary Nodes, SNs, sent by a Master Node, MN;
   performing a measurement evaluation on the one or more SNs according to the configuration information of the one or more SNs to determine an SN satisfying a connectivity condition;
   initiating a random access process to the SN satisfying the connectivity condition, and simultaneously notifying the MN of the SN satisfying the connectivity condition through an RRC reconfiguration complete message sent to the MN; or simultaneously notifying the MN of the SN satisfying the connectivity condition through an SN access request/notification/instruction message separately sent to the MN;
   wherein the receiving configuration information of one or more Secondary Nodes, SNs, sent by a Master Node, MN, comprises:
   receiving an RRC reconfiguration message sent by the MN after extracting or separately cascading the configuration information of one or more SNs.

2. The method of claim 1, wherein the MN is a master network node entity MN or a master serving cell under the master network node entity MN, and the SN is a secondary network node entity SN or a master serving cell under the secondary network node entity SN.

3. The method of claim 1, wherein the connectivity condition comprises any one or more of:
   measurement results of one or more measurement quantities of a cell under the SN meet corresponding preset threshold requirements;
   measurement results of one or more measurement quantities of a cell under the SN are superior to measurement results of corresponding measurement quantities of a specified cell;
   a timer used to time the SN measurement evaluation expires;
   wherein the measurement quantities comprise any one or more of:
   Reference Signal Receiving Power, RSRP;
   Reference Signal Receiving Quality, RSRQ;
   Signal to Interference & Noise Ratio, SINR.

4. The method of claim 1, wherein the receiving configuration information of one or more SNs sent by the MN, comprises:
   obtaining the configuration information of one or more SNs sent by the MN;
   wherein the method further comprises:
   sending an RRC reconfiguration complete message corresponding to the configuration information of the one or more SNs directly to the MN after receiving the RRC reconfiguration message sent by the master node; or
   sending an RRC reconfiguration complete message corresponding to the configuration information of the SN satisfying the connectivity condition to the MN after determining the SN satisfying the connectivity condition.

5. A dual/multi-connectivity-based secondary node addition/replacement method, comprises:
   sending a Secondary Node, SN, addition request to one or more SNs in advance;
   receiving configuration information returned by the one or more SNs, and sending the configuration information of the one or more SNs to a User Equipment, UE;
   wherein the receiving configuration information returned by the one or more SNs and sending the configuration information of the one or more SNs to a UE, comprises:
   receiving the configuration information returned by the one or more SNs through an addition request confirmation message; and
   sending the configuration information of the one or more SNs to the UE through an RRC reconfiguration message;
   wherein after the sending the configuration information of the one or more SNs to the UE, the method further comprises:
   obtaining an SN satisfying a connectivity condition determined by the UE based on a measurement evaluation of the one or more SNs, or receiving a determined SN satisfying the connectivity condition notified after the SN satisfying the connectivity condition establishes a connection with the UE;

wherein the obtaining an SN satisfying a connectivity condition determined by the UE based on a measurement evaluation of the one or more SNs, comprises:

obtaining the determined SN satisfying the connectivity condition through an RRC reconfiguration complete message sent by the UE; or obtaining the determined SN satisfying the connectivity condition through an SN access request/notification/instruction message sent separately by the UE;

wherein the method further comprises:

releasing, by a Master Node, MN, SNs that have not been requested by the UE to establish connections, after determining that the UE establishes a connection with the SN satisfying the connectivity condition;

wherein after the obtaining the determined SN satisfying the connectivity condition through the RRC reconfiguration complete message sent by the UE, the method further comprises:

sending an SN reconfiguration complete message to the SN satisfying the connectivity condition;

sending an SN change confirmation message to an original SN that has been connected to the UE previously after receiving the determined SN satisfying the connectivity condition notified after the SN satisfying the connectivity condition establishes a connection with the UE.

6. The method of claim 5, wherein the SN is a secondary network node entity SN or a master serving cell under the secondary network node entity SN.

7. The method of claim 5, wherein the connectivity condition comprises any one or more of:

measurement results of one or more measurement quantities of a cell under the SN meet corresponding preset threshold requirements;

measurement results of one or more measurement quantities of a cell under the SN are superior to measurement results of corresponding measurement quantities of a specified cell;

a timer used to time the SN measurement evaluation expires;

wherein the measurement quantities comprise any one or more of:

Reference Signal Receiving Power, RSRP;

Reference Signal Receiving Quality, RSRQ;

Signal to Interference & Noise Ratio, SINR.

8. The method of claim 5, wherein the sending an SN addition request to one or more SNs in advance, comprises:

sending an SN addition request to one or more SNs based on a measurement result reported by the UE, or sending an SN addition request to one or more SNs based on an SN change request sent by an original SN that has been connected to the UE.

9. The method of claim 5, further comprises:

receiving an RRC reconfiguration complete message corresponding to the configuration information of the one or more SNs sent directly by the UE after receiving the RRC reconfiguration message; or receiving an RRC reconfiguration complete message corresponding to the configuration information of the SN satisfying the connectivity condition sent by the UE after determining the SN satisfying the connectivity condition.

10. The method of claim 9, wherein after receiving the RRC reconfiguration complete message corresponding to the configuration information of the SN satisfying the connectivity condition sent by the UE after determining the SN satisfying the connectivity condition, the method further comprises:

sending an SN change confirmation message to an original SN that has been connected to the UE previously.

11. The method of claim 5, further comprises:

receiving indication information indicating that the SN has completed establishment of a random access with the UE sent by the SN satisfying the connectivity condition.

12. A terminal device for a dual/multi-connectivity-based secondary node addition/replacement method, comprises a processor and a memory, the memory is configured to store a program executable by the processor, and the processor is configured to read the program in the memory and perform following steps:

receiving configuration information of one or more Secondary Nodes, SNs, sent by a Master Node, MN;

performing a measurement evaluation on the one or more SNs according to the configuration information of the one or more SNs to determine an SN satisfying a connectivity condition;

initiating a random access process to the SN satisfying the connectivity condition, and simultaneously notify the MN of the SN satisfying the connectivity condition through an RRC reconfiguration complete message sent to the MN; or simultaneously notify the MN of the SN satisfying the connectivity condition through an SN access request/notification/instruction message separately sent to the MN;

wherein the processor is configured to receive the reconfiguration message sent by the MN by:

receiving an RRC reconfiguration message sent by the MN after extracting or separately cascading the configuration information of one or more SNs.

13. The device of claim 12, wherein the MN is a master network node entity MN or a master serving cell under the master network node entity MN, and the SN is a secondary network node entity SN or a master serving cell under the secondary network node entity SN.

14. The device of claim 12, wherein the processor is configured to:

obtain the configuration information of one or more SNs sent by the MN;

wherein the processor is further configured to:

send an RRC reconfiguration complete message corresponding to the configuration information of the one or more SNs directly to the MN after receiving the RRC reconfiguration message sent by the master node; or send an RRC reconfiguration complete message corresponding to the configuration information of the SN satisfying the connectivity condition to the MN after determining the SN satisfying the connectivity condition.

15. A network-side device for a dual/multi-connectivity-based secondary node addition/replacement method, comprises a processor and a memory, the memory is configured to store a program executable by the processor, and the processor is configured to read the program following steps:

sending a Secondary Node, SN, addition request to one or more SNs in advance;

receiving configuration information returned by the one or more SNs, and sending the configuration information of the one or more SNs to a User Equipment, UE;

wherein the receiving configuration information returned by the one or more SNs and sending the configuration information of the one or more SNs to a UE, comprises:
receiving the configuration information returned by the one or more SNs through an addition request confirmation message; and
sending the configuration information of the one or more SNs to the UE through an RRC reconfiguration message;
wherein after sending the configuration information of the one or more SNs to the UE, the processor is further configured to:
obtain an SN satisfying a connectivity condition determined by the UE based on a measurement evaluation of the one or more SNs; or
receive the determined SN satisfying the connectivity condition notified after the SN satisfying the connectivity condition establishes a connection with the UE;
wherein the processor is configured to:
obtain determined SN satisfying the connectivity condition through an RRC reconfiguration complete message sent by the UE; or
obtain determined SN satisfying the connectivity condition through an SN access request/notification/instruction message sent separately by the UE;
wherein the processor is further configured to:
release SNs that have not been requested by the UE to establish connections, after determining that the UE establishes a connection with the SN satisfying the connectivity condition;
wherein after the obtaining the determined SN satisfying the connectivity condition through the RRC reconfiguration complete message sent by the UE, the processor is further configured to:
send an SN reconfiguration complete message to the SN satisfying the connectivity condition;
send an SN change confirmation message to an original SN that has been connected to the UE previously after receiving the determined SN satisfying the connectivity condition notified after the SN satisfying the connectivity condition establishes a connection with the UE.

16. The device of claim 15, wherein the SN is a secondary network node entity SN or a master serving cell under the secondary network node entity SN.

* * * * *